US008295950B1

(12) United States Patent
Wordsworth et al.

(10) Patent No.: US 8,295,950 B1
(45) Date of Patent: Oct. 23, 2012

(54) INTELLIGENT POWER MANAGEMENT SYSTEM

(76) Inventors: Jerry Lee Wordsworth, Rocky Mount, NC (US); Jerry Barnes, Whitakers, NC (US); Gregory D. Buckner, Cary, NC (US)

( * ) Notice: Subject to any disclaimer, the term of this patent is extended or adjusted under 35 U.S.C. 154(b) by 622 days.

(21) Appl. No.: 12/414,117

(22) Filed: Mar. 30, 2009

Related U.S. Application Data

(60) Provisional application No. 61/077,715, filed on Jul. 2, 2008.

(51) Int. Cl.
G05B 11/01 (2006.01)
(52) U.S. Cl. ............... 700/22; 700/297; 62/77; 62/236; 701/29.1; 307/86
(58) Field of Classification Search .................. 700/22, 700/297; 62/77, 236; 307/86; 701/29.1
See application file for complete search history.

(56) References Cited

U.S. PATENT DOCUMENTS

| | | |
|---|---|---|
| 3,903,696 A | 9/1975 | Carman |
| 4,780,618 A | 10/1988 | Wareman et al. |
| 5,487,278 A * | 1/1996 | Hilleveld et al. ............... 62/236 |
| 5,608,271 A | 3/1997 | Saka et al. |
| 5,633,537 A | 5/1997 | Kurata et al. |
| 5,640,055 A | 6/1997 | Sugiyama et al. |
| 5,717,310 A | 2/1998 | Sakai et al. |
| 5,796,175 A | 8/1998 | Itoh et al. |
| 5,834,854 A | 11/1998 | Williams |
| 5,907,194 A | 5/1999 | Schenk et al. |
| 5,969,438 A | 10/1999 | Odaohara |
| 5,977,652 A | 11/1999 | Frey et al. |
| 5,977,656 A | 11/1999 | John |
| 6,037,744 A | 3/2000 | Rhodes |
| 6,037,745 A | 3/2000 | Koike et al. |
| 6,049,141 A | 4/2000 | Sieminski et al. |
| 6,111,768 A | 8/2000 | Curtiss |
| 6,157,175 A | 12/2000 | Morinigo et al. |
| 6,169,669 B1 | 1/2001 | Choudhury |
| 6,177,737 B1 | 1/2001 | Palfey et al. |
| 6,226,305 B1 | 5/2001 | McLoughlin et al. |
| 6,232,674 B1 | 5/2001 | Frey et al. |
| 6,263,269 B1 * | 7/2001 | Dannenberg .................... 701/29 |
| 6,265,853 B1 | 7/2001 | Takagi et al. |

(Continued)

OTHER PUBLICATIONS

Auragen. Power. On the Go, FAQ 2—Tech and Intro, http://www.aurasystems.com/pp./faq2.htm.

(Continued)

*Primary Examiner* — Mohammad Ali
*Assistant Examiner* — Sheela S Rao
(74) *Attorney, Agent, or Firm* — Murphy, Bilak & Homiller, PLLC

(57) ABSTRACT

A refrigerated truck has a power management system for optimally distributing power between one or more energy sources, energy sinks, or energy storage components on the refrigerated truck. One such power consuming component includes a refrigeration unit that cools a refrigerated compartment of the refrigerated truck. Particularly with regard to this refrigeration unit, the power management system is operative to direct power from multiple power sources to the refrigeration unit so as to efficiently use available power. To do so, the power management system dynamically determines the availability of certain power sources and selects a preferred power source based on availability and a defined order of power source preference. For example, one defined order of power source preference may include, in order of preference upon availability, a shore power source, a truck engine generator drivingly connected to the refrigerated truck's engine, one or more auxiliary power sources, and a stand alone refrigerator unit engine.

7 Claims, 21 Drawing Sheets

U.S. PATENT DOCUMENTS

| | | |
|---|---|---|
| 6,267,351 B1 | 7/2001 | Schneider |
| 6,301,528 B1 | 10/2001 | Bertram et al. |
| 6,396,169 B1 | 5/2002 | Voegeli et al. |
| 6,427,107 B1 | 7/2002 | Chiu et al. |
| 6,449,537 B1 | 9/2002 | Phillips et al. |
| 6,456,908 B1 | 9/2002 | Kumar |
| 6,465,910 B2 | 10/2002 | Young et al. |
| 6,470,680 B2 | 10/2002 | Janeke |
| 6,522,030 B1 | 2/2003 | Wall et al. |
| 6,611,068 B2 | 8/2003 | Cratty |
| 6,615,118 B2 | 9/2003 | Kumar |
| 6,633,802 B2 | 10/2003 | Sodoski et al. |
| 6,642,633 B1 | 11/2003 | Yang |
| 6,687,580 B2 | 2/2004 | Suzuki et al. |
| 6,700,214 B2 | 3/2004 | Ulinski et al. |
| 6,742,343 B2 | 6/2004 | Matonog et al. |
| 6,803,677 B2 | 10/2004 | Algrain et al. |
| 6,833,119 B1 | 12/2004 | Inman et al. |
| 6,979,913 B2 | 12/2005 | Storm et al. |
| 6,985,799 B2 | 1/2006 | Zalesski et al. |
| 7,042,115 B2 | 5/2006 | Mizutani et al. |
| 7,057,303 B2 | 6/2006 | Storm et al. |
| 7,064,458 B2 | 6/2006 | Wittner |
| 7,120,520 B2 | 10/2006 | Seto et al. |
| 7,176,585 B2 | 2/2007 | Fehr |
| 7,231,959 B2 | 6/2007 | Larson |
| 7,239,045 B2 | 7/2007 | Lathrop et al. |
| 7,262,520 B2 | 8/2007 | Nguyen et al. |
| 7,276,815 B2 | 10/2007 | Algrain et al. |
| 7,290,592 B2 | 11/2007 | Larson |
| 2003/0000236 A1 | 1/2003 | Anderson et al. |
| 2003/0205360 A1 | 11/2003 | Larson |
| 2005/0240325 A1 | 10/2005 | Mayer et al. |
| 2006/0010892 A1 | 1/2006 | Awwad et al. |
| 2006/0030450 A1 | 2/2006 | Kyle |
| 2006/0137923 A1 | 6/2006 | Larson |
| 2006/0137924 A1 | 6/2006 | Larson |
| 2006/0151163 A1* | 7/2006 | Zeigler et al. ............... 165/240 |
| 2007/0046265 A1* | 3/2007 | Nakamura ................... 322/27 |
| 2007/0052241 A1* | 3/2007 | Pacy ........................... 290/1 R |
| 2008/0011007 A1 | 1/2008 | Larson et al. |
| 2008/0034773 A1* | 2/2008 | Karapetian ................... 62/236 |
| 2008/0104971 A1 | 5/2008 | Sami |
| 2008/0252469 A1 | 10/2008 | Perten et al. |

OTHER PUBLICATIONS

Auragen. Power. On the Go, Products, http://aurasystems.com/pages/prod_oasis.html.

Fabco Power, The Powerall—Mobile Generator 6KW and 4KW, 120VAC, http://www.fabcopower.com/powerall2.htm.

Fabco Power, Power-Mite Patented Innovation, http://www.fabcopower.com/generat/bgen.htm.

* cited by examiner

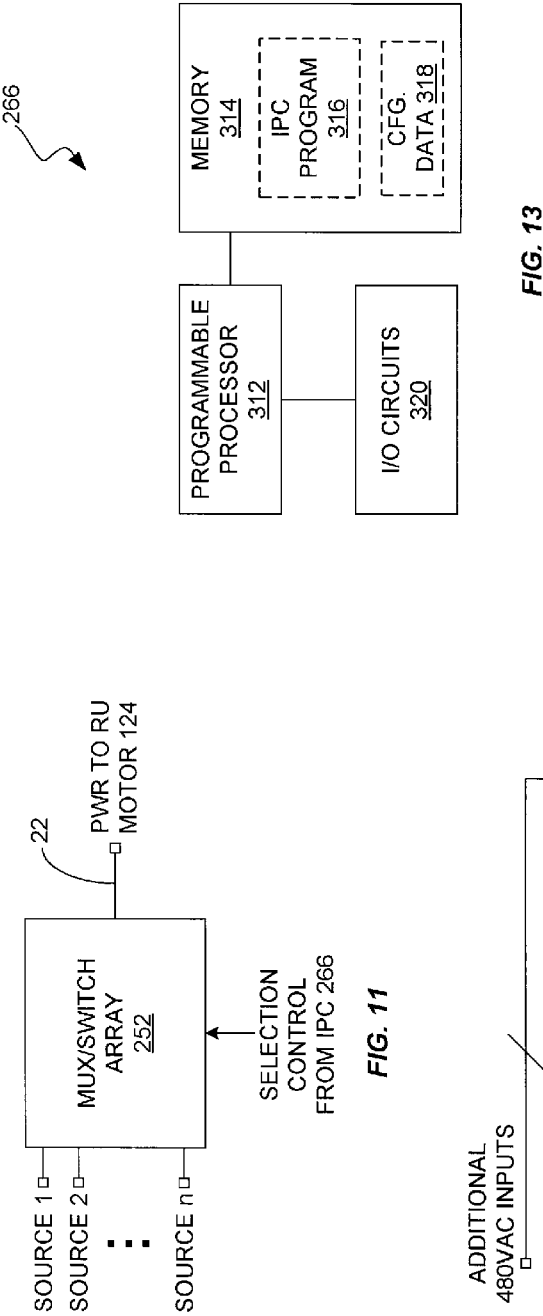
FIG. 13
FIG. 11
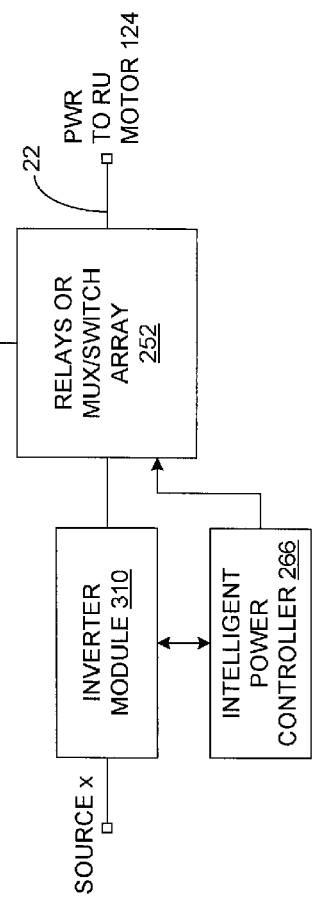
FIG. 12

INTELLIGENT POWER MANAGEMENT SYSTEM

CROSS REFERENCE TO RELATED APPLICATION

This application claims priority under 35 U.S.C. §119(e) from the U.S. provisional patent application filed on 2 Jul. 2008, which is entitled "Intelligent Power Management System" and identified by Application No. 61/077,715.

BACKGROUND OF THE INVENTION

The increasing cost of fossil fuels has a substantial impact on the residential sector, business of all types and industry in general. Accounting for the costs of energy has become a major and pressing issue throughout developed society, and it is more vexing than ever before. The long term outlook for fossil fuels provides bases for little or no expectation of major downturns in fuel costs. Conservation, alternative energy sources, and changes in life style and manner of doing business are all being more widely and seriously considered in attempts to address the challenges of the energy situation.

Transportation is a key element of the propagation of energy costs throughout society. Goods require movement from one place to another to facilitate manufacturing and distribution of products to consumers. In the case of perishable goods, such as fresh and frozen foods, the large and increasing costs are not only due to the energy required for moving the goods around but also the energy required for keeping the goods cool or frozen during transport. Businesses engaged in the storage and transportation of perishable foods face then a double impact as fuel costs rise, and their customers likewise share the cost.

Refrigerated transport of perishable foods, frozen or chilled foods in particular, generally involves the utilization of tractor-trailer trucks operating on highways. Food is loaded from storage sites into insulated portions of trailers where required refrigeration is maintained typically by a dedicated gasoline or diesel engine powered refrigeration system that is on-board the trailer. As the tractor-trailer moves the load from one point to another, generally stopping at various points to make deliveries, the on-board refrigeration system maintains the required cold conditions in the trailer. The fuel required to operate such on-board refrigeration systems is a significant portion of the fuel usage in refrigerated transport of foods.

While one or more on-board dedicated engines provides stand-alone refrigeration for the trailer or refrigerated compartment, the fuel conversion efficiency of the typical engine appropriately sized for this service is less than the efficiency, for example, of the large tractor engine that provides motive power for the tractor-trailer. Moreover, energy recovery such as is practicable with regenerative braking offers a source of energy that might be useful in meeting some of the energy demands of refrigerated food transport. Likewise, alternatives, such a solar energy collection may offer other sources.

Driver comfort and convenience is also a significant factor in such transport activities. For example, cab air conditioning and heating must be maintained not only during cruising speeds, but often while stopped and parked for relatively short periods. When a sleeper cab is in use, maintaining cab cooling and heating is important for operator rest. While keeping such systems active can be done by keeping the tractor engine running or idling, this is a very inefficient mode of operation. Such engines, while relatively efficient at cruising speeds, can be relatively inefficient at low speeds such as at idle. An alternative that has found significant use to address this problem is the so-called auxiliary power unit, or APU. One typical APU includes a battery pack with an inverter to produce AC power to power an APU cab air condition system (HVAC system) that is used to air condition the cab when the tractor engine is not operating at an efficient speed. This type of APU also includes a charger system for charging the battery pack from shore power when available. Other types of APUs may include a small dedicated internal combustion engine to power the APU AC system.

A common configuration for a tractor-refrigerated trailer rig might include, in addition to the tractor engine, a refrigeration unit engine. Additionally, there may be alternative sources of recovered or available energy or power such as regenerative braking systems and solar collection systems. While every energy or power source has a particular principal consumer—locomotion for the tractor engine and refrigeration for the refrigeration engine, for example—there may be conditions in which energy or power may be channeled or used in different ways in order to achieve optimal efficiency of each power or energy source and reduce overall fuel consumption.

There is a need for a system and approach for management of the various power or energy sources in refrigerated transport for optimal energy efficiency.

SUMMARY OF THE INVENTION

The present invention is a refrigerated truck having a power management system for managing the generation and use of power on the refrigerated truck.

In one embodiment, a refrigerated truck is provided with a power management system for optimally distributing power between one or more energy sources, energy sinks, or energy storage components on the refrigerated truck. The refrigerated truck includes a truck engine and a refrigeration compartment having a refrigeration unit that includes an engine, an electric motor, and a compressor. The power management system is operative to direct power from multiple power sources to the refrigeration unit such that the refrigeration unit can be driven from any one of the multiple power sources or from the refrigeration unit engine. To provide the multiple sources of power, the refrigerated truck is equipped with a shore power input that is operative to receive power from a shore power source. Further, a generator is drivingly connected to the truck engine and this provides another source of power. The power management system dynamically determines the availability of certain power sources and selects a preferred power source based on availability and a defined order of power source preference. At various times, for example, the shore power source may be available and the power management system may select that source to power the refrigeration unit. At other times, power from the truck engine driven generator may be available and the power management system may select that source to power the refrigeration unit. Still at other times, one or more of the more preferred sources of power may not be available, and the refrigeration unit is powered by the refrigeration unit engine.

Other objects and advantages of the present invention will become apparent and obvious from a study of the following description and the accompanying drawings which are merely illustrative of such invention.

BRIEF DESCRIPTION OF THE DRAWINGS

FIG. 11 is a block diagram of a switch array, for use by the intelligent power management system in selecting from among available power sources according to order of preference.

FIG. 12 is a block diagram of the intelligent power management system, wherein the intelligent power management system receives conditioned power and, optionally, associated power quality signaling from an associated power inverter.

FIG. 13 is a block diagram of a microprocessor-based intelligent power management controller, for use in the intelligent power management system.

DESCRIPTION OF EXEMPLARY EMBODIMENTS

Figure 1:
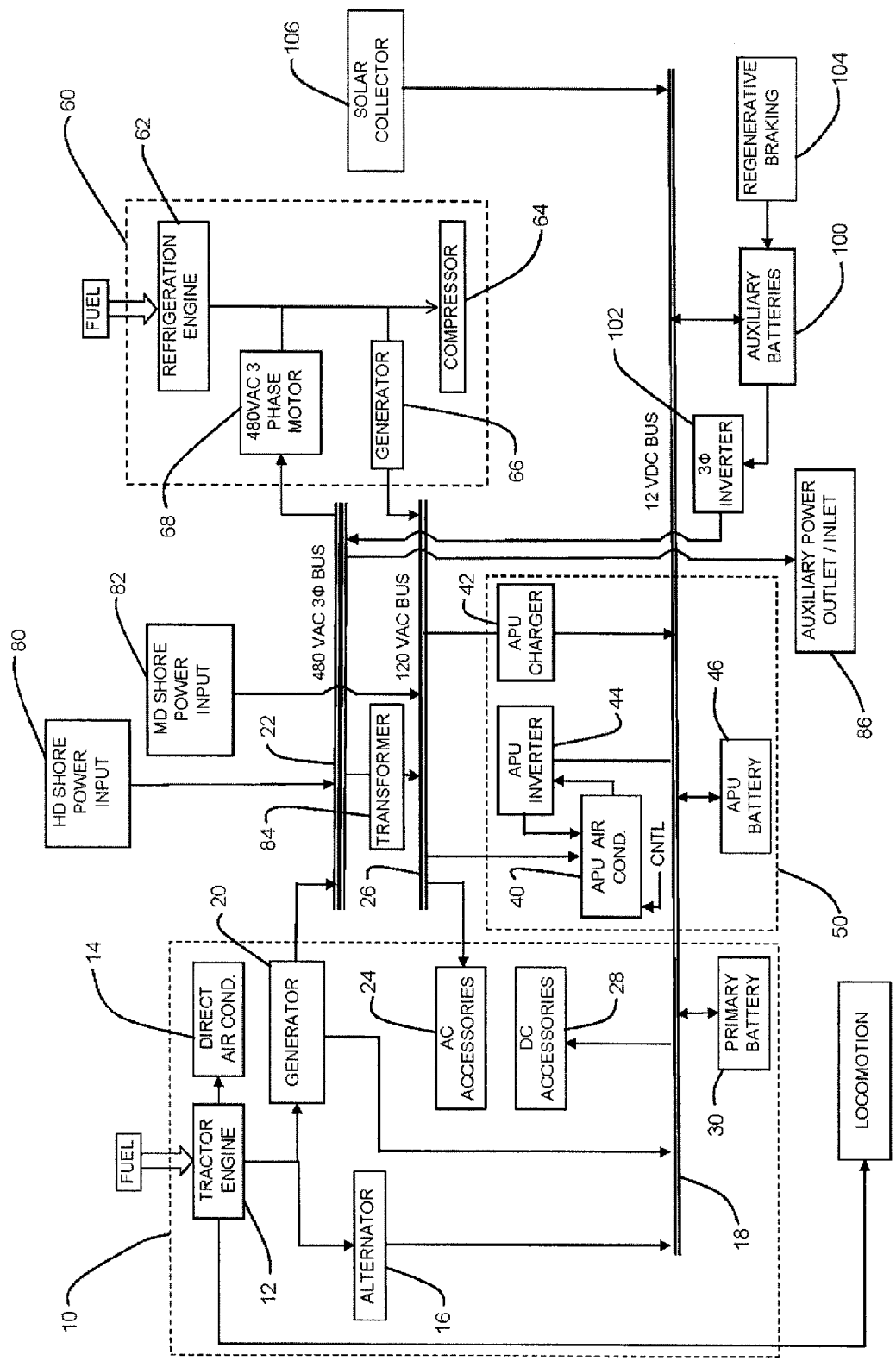
FIG. 1 is a schematic illustration of an intelligent power management system for managing the power and use of power by a tractor-refrigerated trailer.

The present invention relates to an intelligent power management system that manages the generation of power, use of power, and storage of power in a system. In particular, the intelligent power management system is utilized in a system including multiple sources of power, multiple components that consume power, and one or more energy storage devices such as batteries and/or ultracapacitors. Generally, the intelligent power management system determines what source of power is available at any particular time under varying circumstances and at the same time determines what power consuming components are calling for or are in need of power. Based on predetermined criteria and control or program logic, the intelligent power management system directs power from one or more of the various power sources to one or more of the various components that need power so as to efficiently use available power and lower the total cost of power utilized by the system.

The intelligent power management system of the present invention can be utilized in many different applications and in various ways. In the exemplary embodiments illustrated herein, the intelligent power management system is implemented in a refrigerated truck. The term "refrigerated truck" means and encompasses a truck that includes a refrigeration compartment or a tractor-trailer configuration where the tractor is connected to a "tractor-refrigerated trailer" that includes a refrigeration compartment. The below discussion will illustrate the present invention in the context of this latter embodiment, but does not limit the invention to only tractor-refrigerated trailers. Indeed, whether included in a truck or a tractor-refrigerated trailer, the refrigeration compartment therein typically includes a freezer compartment and a cooling compartment, and is cooled by a refrigeration unit.

As discussed below, the refrigerated truck is powered by an internal combustion engine, typically a diesel engine. The refrigeration unit includes a stand alone engine, separate from the refrigerated truck's engine, which powers, directly or indirectly, a compressor. As will be discussed subsequently herein, electrical power from a shore power source or the refrigerated truck's engine via a generator is used from time-to-time to power the refrigeration unit.

Further as discussed below, the tractor-refrigerated trailer includes an auxiliary power unit (APU) that includes one or more batteries utilized to drive an APU air conditioning system, and to provide power to both AC and DC accessories associated with the tractor-refrigerated trailer. In some cases, the APU air conditioning system or unit is referred to as an HVAC system. The term "HVAC system" encompasses an air conditioning unit, a heating unit, or a combination air conditioning-heating unit.

Additionally, the intelligent power management system associated with the tractor-refrigerated trailer includes other power inputs or power conversion components such as regenerative braking systems, solar collectors, shore power inputs, and auxiliary batteries and/or ultracapacitors for storing excess energy provided to or captured by the system. As discussed subsequently herein, the intelligent power management system generally continuously monitors the various power components and sub-systems of the tractor-refrigerated trailer and optimizes the generation, conversion, use, and storage of power on the tractor-refrigerated trailer. The focus of the intelligent power management system is on the efficient use of available power and because there are multiple power sources, the intelligent power management system on an ongoing basis determines which power sources can be most efficiently utilized to deliver power to certain power consuming components of the overall system.

With further reference to the drawings, FIG. 1 is a schematic illustration of the intelligent power management system incorporated into a tractor-refrigerated trailer. A tractor unit 10 includes an internal combustion engine 12 which is typically a diesel engine. Engine 12 drives a direct or conventional air conditioning unit 14 associated with a cab of the tractor unit 10. In addition, engine 12 drives an alternator 16 that is operative to supply power to a DC bus 18. In addition, engine 12 drives an electric generator 20. Generator 20 in the embodiment illustrated in FIG. 1 includes two outputs, a DC output and an AC output. The DC output of generator 20 is directed to the bus 18. The AC output of generator 20 is directed to an AC bus 22. Although the rating of the various AC buses disclosed herein can vary, the bus 22 may be a 480 VAC three phase bus. Generator 20 can provide various AC outputs. In the exemplary embodiment of FIG. 1, it is contemplated that the generator 20 will provide a three phase 480 VAC output. While the power output of generator 20 can vary, it is contemplated that its power output will be approximately 7.5-20 kW. The DC output of generator 20 is 12 VDC, and DC bus 18 is accordingly a 12 VDC bus.

Tractor 10 further includes AC accessories indicated by block 24. AC accessories 24 may include lighting, AC outlets, etc. As seen in FIG. 1, the AC accessories 24 are operatively connected to a 120 VAC bus 26 and are powered thereby. Additionally, the refrigerated trailer or compartment may include accessories requiring AC power from bus 26.

Additionally, tractor 10 includes DC accessories denoted by block 28 in FIG. 1. DC accessories 28 include such components as radio, low voltage lighting and certain other electrical controls associated with tractor 10. DC accessories 28 are operatively connected to and powered by the bus 18. The refrigerated trailer or compartment may also include various DC accessories requiring power from bus 18.

Finally, the tractor 10 includes a primary battery or battery set 30. Primary battery or battery set 30 is operatively connected to the bus 18 and as such, is operative to provide cranking power to the tractor 10 as well as in some cases supplying power to components that take DC power from bus 18.

It is appreciated that the primary function of tractor 10 is to power the tractor-refrigerated trailer up and down roadways. As illustrated in FIG. 1, the tractor engine 12 is operative to provide locomotion to the tractor-refrigerated trailer.

The tractor-refrigerated trailer discussed above is provided with an auxiliary power unit (APU) 50. The APU is operative to provide power directly or indirectly to various power consuming components of the system. However, as explained below, one of the principal functions of the APU is to power an APU air conditioner 40 (HVAC system) which forms a part of the APU and is separate and distinct from the direct air conditioning unit 14 discussed above. More particularly, the direct air conditioning unit 14 is selectively powered by the tractor engine 12 and thus is available when the tractor engine 12 is running. The APU air conditioner 40 is meant for operation when the tractor engine 12 is not running and, in at least one embodiment, the direct air conditioning unit 14 provides a DC control signal to the APU air conditioner 40, which prevents the APU air conditioner 40 from running whenever the direct air conditioning unit 14 is running. (See the "CNTL" signal input to the APU air conditioner 40). When allowed to run, the APU air conditioner 40 is powered from the 120 VAC bus 26 or, if that bus is not energized, is powered from an APU battery 46 via an APU inverter 44 connected to the 12 VDC bus 18. An APU charger 42, advantageously powered by the 120 VAC bus 26, provides DC charging current to the APU battery 46.

Thus, the APU air conditioner 40 is particularly adapted to provide cooling to the cab of the tractor 10 at times when the direct air conditioning unit 14 is not available. While the configuration of the APU can vary, in one embodiment, the APU charger 42 and the APU inverter 44 form a part of a single unit. Functionally, the APU charger 42 is interconnected between the 120 VAC bus 26 and the bus 18. Essentially, the APU charger 42 is operative to rectify AC power existing on bus 26 and direct the rectified power in the form of DC power to the bus 18.

Also, as noted in FIG. 1, APU battery or battery pack or set 46 is operatively connected to the bus 18. The APU battery or battery set 46 is operative to supply power via the APU inverter 44 to the APU air conditioner or HVAC unit 40 and, in one or more embodiments, also may act as a power source for the AC accessories 24. Thus, it is appreciated that when the tractor 10 is stationary and its engine 12 is shut off, the APU battery or battery pack 46 may be utilized to drive the direct air conditioning unit 14 associated with the cab of the tractor unit 10 or the APU air conditioner 40, as well as the AC accessories 24. Because the same battery pack 46 supplies power to the bus 18, it is appreciated that the APU battery or battery pack can also supply power to the DC accessories.

In one embodiment, the APU battery or battery set 46 is operatively linked with primary battery or batteries 30 such that both battery sets are operative to deliver DC power to bus 18 and to be charged thereby under certain conditions. However, to assure that there is sufficient battery power to crank the tractor engine 12, the charge existing on the primary battery or battery set 30 is continuously monitored. When the charge on the primary battery or primary battery pack 30 falls below a predetermined threshold, the intelligent power management system is operative to effectively decouple the primary battery or battery set 30 from any load. In one embodiment, the intelligent power management system disconnects battery set 30 and effectively couples the primary battery 30 directly to the alternator 16 such that these batteries will receive a priority charge from the alternator 16 when the tractor engine 12 is started. There are, of course, various ways for automatically coupling and decoupling the primary battery or battery set 30 from the bus 18 to achieve this objective.

Figure 2:
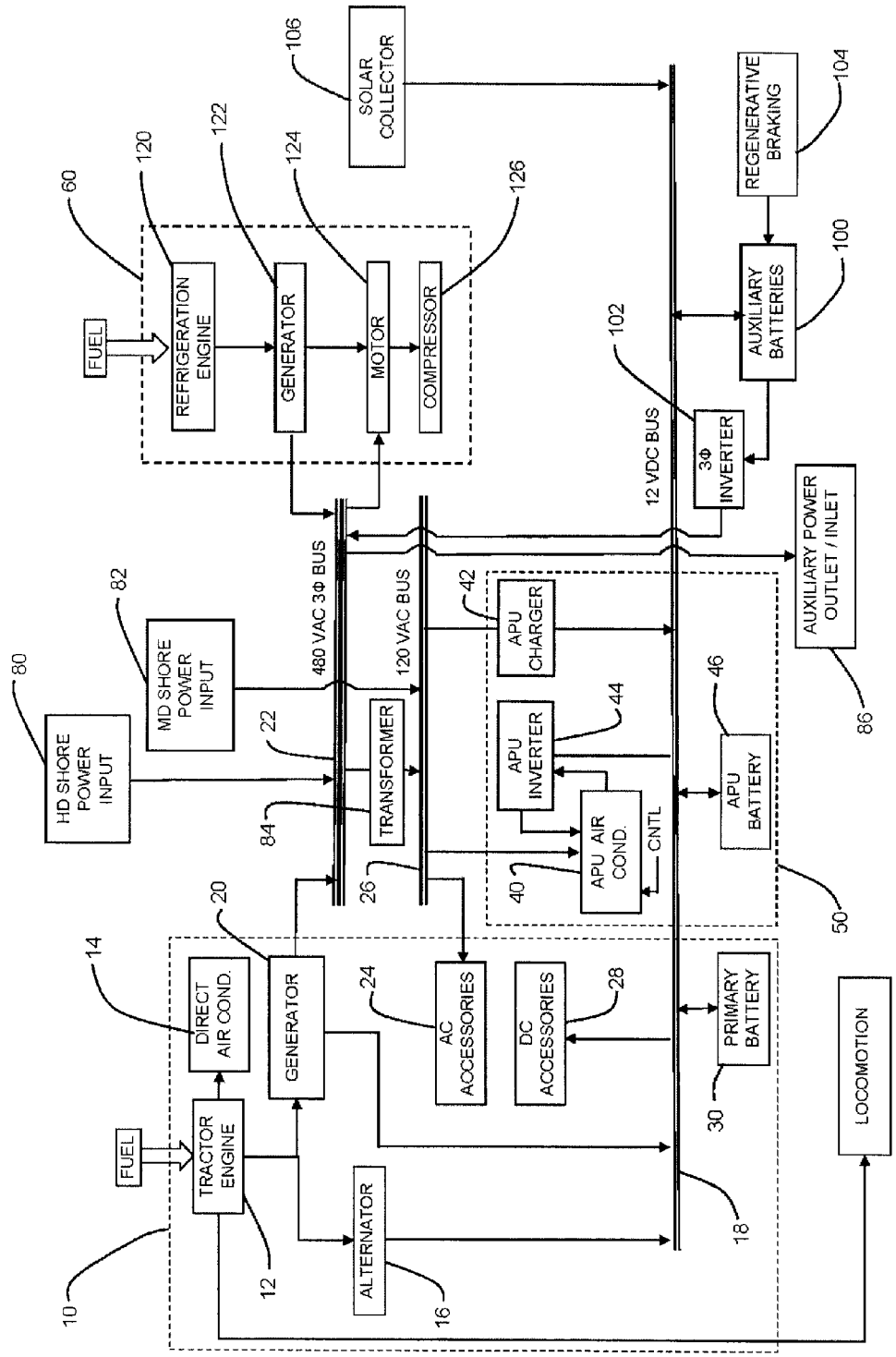
FIG. 2 is a schematic illustration similar to FIG. 1 but illustrating a different configuration for the refrigeration unit forming a part of a power management system.

The tractor-refrigerated trailer includes a refrigeration unit indicated by the numeral 60 in FIG. 1. The configuration and the components of the refrigeration unit 60 can vary. One embodiment is shown in FIG. 1 while a second embodiment for the refrigeration unit is shown in FIG. 2. First, with respect to the FIG. 1 embodiment, the refrigeration unit 60 includes a dedicated engine 62. Engine 62 in this example is an internal combustion diesel engine. While the horsepower may vary, in one embodiment it is contemplated that the engine 62 is of a 20 to 25 horsepower engine. Engine 62 is directly mechanically coupled to a compressor 64 that is utilized by the refrigeration unit 60 to cool one or more compartments on the trailer. In addition to the engine 62 and compressor 64, the refrigeration unit 60 includes a generator 66 that is driven by the engine 62. Generator 66 in this embodiment is a 120 volt AC generator capable of a power output of approximately 3 to 3.5 kw. The power output can vary. Generator 66 is operatively coupled to the 120 VAC bus 26. The intelligent power management system is operative to sense conditions that justify utilizing the refrigeration engine 62 to drive the generator 66 in order to supply AC power to bus 26. It follows that in selected conditions and circumstances, the power generated by generator 66 can be used to power the APU air conditioner 40, the AC accessories 24 as well as supplying power to the bus 18 for various uses.

Furthermore, the refrigeration unit 60 includes an electric motor 68 operatively coupled to the compressor 64 for driving the same under certain selected conditions. In the case of this embodiment, motor 68 is a three phase 480 VAC motor. Note in FIG. 1 where motor 68 is operatively connected to the three phase 480 VAC bus 22. Hence, the compressor 64 can be driven by the generator 20 of the tractor 10 via the 480 VAC three phase bus 22 under certain conditions. That is, the tractor engine 12 drives the generator 20 which in turn produces an AC output that is directed onto bus 22 and the power on bus 22 can be utilized to drive the motor 68. As will be discussed subsequently herein, there are conditions experienced by the tractor-refrigerated trailer that warrant, from an efficiency point of view, driving the compressor 64 via tractor 10. It is postulated that under certain conditions at least, that it is more efficient to derive power for driving the compressor 64 from the tractor engine 12 than the trailer-mounted dedicated refrigeration engine 62.

As seen in FIG. 1, there are provided various power inputs to the overall system. In the case of the embodiment shown in FIG. 1, the system includes inputs for shore power. Shore power is a term used to designate a stationary power supply such as provided by electric power companies and electric utilities. As seen in FIG. 1, the system includes a heavy duty (HD) shore power input 80 which is operatively coupled to the three phase 480 VAC bus 22. By connecting a HD shore power source of three phase 480 VAC to the HD shore power input 80, power can be selectively directed from this source to the bus 22 and thus can be utilized to drive the compressor 64 via motor 68.

In addition, operatively interconnected between bus 22 and bus 26 is a transformer 84 that is operative to convert the three phase 480 VAC power existing on bus 22 to 120 VAC and to deliver the converted voltage to bus 26 where it can be used to power such components as the APU air conditioner 40 and the AC accessories 24. The bus 26 also may be energized directly from a medium duty (MD) shore power input 82, when that input is operatively connected to a 120 VAC source of MD shore power. Note that medium duty shore power input 82 is operatively coupled to bus 26 such that the 120 VAC shore power can be directed to bus 26 for utilization by any one of the power consuming components operatively connected thereto.

There may be occasions when it is desirable for the system depicted in FIG. 1 to supply power to a power consuming component or system unassociated with the tractor-refrigerated trailer. For example, there may be a need to supply power to another tractor-refrigerated trailer that has lost all power generating or supplying ability. To address this need, there is provided an auxiliary power outlet/inlet 86 that is operatively coupled to the three phase 480 VAC bus 22. Thus, by connecting to the auxiliary power outlet 86, three phase AC power can be directed from the tractor-refrigerated trailer of FIG. 1 to another tractor-refrigerated trailer, for example.

As seen in FIG. 1, the intelligent power management system depicted therein includes one or more auxiliary batteries for storing excess energy and supplying energy at selected times based on predetermined conditions. In this regard, the system includes one or more auxiliary batteries, indicated by the numeral 100, connected to DC bus 18. Auxiliary batteries 100 are charged from bus 18 and are also under certain conditions operative to supply power to bus 18. Auxiliary battery or batteries 100 are operatively connected to a three phase inverter 102 that is in turn operative to direct three phase power to bus 22. That is, the intelligent power management system can be programmed to convert DC power gained from the auxiliary batteries 100 to three phase power, for example 480 VAC, and to direct that power to the bus 22 where the power can be used to power compressor 64 and other power consuming components operatively coupled, directly or indirectly, to the 120 VAC bus 26. In addition, through conventional means, power can be recovered from the tractor and refrigerated trailer through regenerative braking 104 and directed to the auxiliary batteries 100 for storage.

Numerous other forms of power inputs can be utilized to drive components of the system as well as to store energy in the various batteries forming a part of the system. In this regard, because of the substantial surface area normally forming a part of refrigerated trailers and trailers in general, their structure is particularly susceptible for use as supporting solar collectors. As indicated in FIG. 1, the tractor-refrigerated trailer is provided with one or more solar collectors 106 utilized to collect solar energy and through conventional means, such as described in U.S. Pat. No. 7,338,335, the disclosure of which is expressly incorporated herein by reference, can be converted to DC power and directed onto DC bus 18 where the same can be directed to various batteries and/or ultracapacitors for storage.

Turning to FIG. 2, an intelligent power management system for a tractor-refrigerated trailer is shown therein and is similar in most regards to that discussed above and depicted in FIG. 1. However, in the FIG. 2 embodiment, the particular configuration of the refrigeration unit 60 is somewhat different from that shown in FIG. 1. Viewing FIG. 2, the refrigeration unit 60 includes a refrigeration engine 120 that is directly coupled to a generator 122 for driving the same. Generator 122 is electrically connected to an AC motor 124 which in turn is mechanically coupled to a compressor 126 for driving the same. One of the features of the refrigeration units 60 shown in FIGS. 1 and 2 is that in both cases, various components of the units can be utilized to generate power and distribute the power in such a way that it can be used by other energy consuming components of the system. For example, in the case of the refrigeration unit 60 shown in FIG. 2, generator 122 is electrically coupled to bus 22 such that under certain conditions the intelligent power management system is operative to utilize the generator 122 to provide power to the bus 22. Furthermore, as with the refrigeration unit 60 shown in FIG. 1, the refrigeration unit depicted in FIG. 2 can be driven indirectly by the tractor engine 12 and the generator 20.

Again, as explained before, generator 20 is operative to provide an AC power output to bus 22 which is operatively coupled to motor 124 and under certain conditions the motor 124 is powered off the bus 22. The intelligent power management system thus advantageously multiplexes ("muxes") a number of independent power sources onto the bus 22. At any given time, only one such source is connected, according to selection control implemented by the intelligent power management system.

Figure 3:
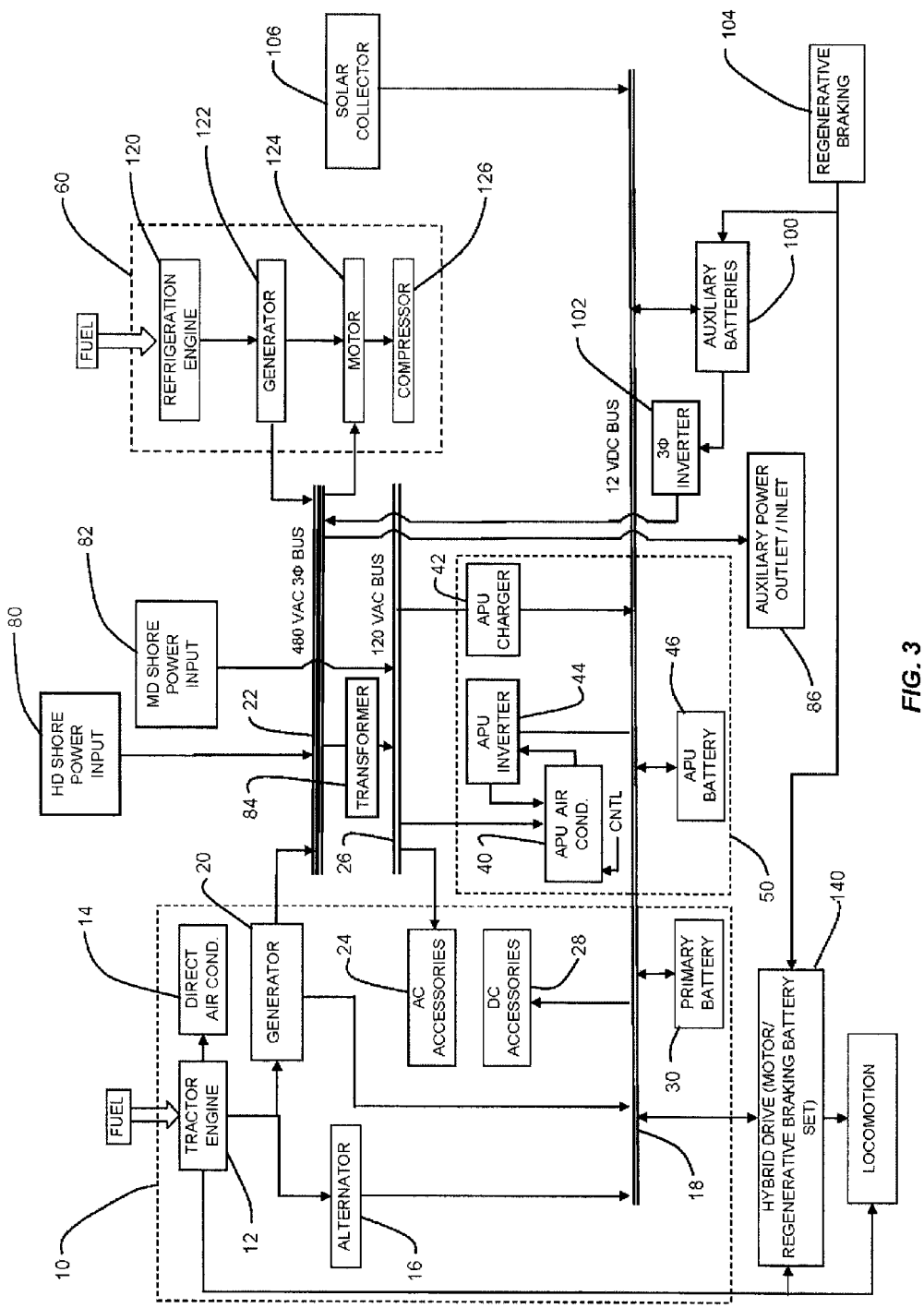
FIG. 3 is a schematic illustration similar to FIGS. 1 and 2 but showing the option of providing a hybrid drive system that cooperates with the engine of the tractor unit.

FIG. 3 is a schematic illustration similar to FIGS. 1 and 2 but wherein the tractor 10 is provided with a hybrid drive. In the case of FIG. 3, there is provided a hybrid drive unit 140 operatively connected between the bus 18, the tractor engine 12, and the driven wheels of the tractor. Details of the hybrid unit 140 are not dealt with herein because they are not per se material to the present invention and further because hybrid drive systems are known. In one embodiment contemplated, the hybrid drive unit 140 includes one or more motors and a battery pack along with the capability of harnessing regenerative braking and storing the energy associated therewith in the associated battery pack.

As discussed above, it is appreciated that the engine 12 of the tractor 10 is utilized to drive the generator 20. Various types of drive systems can be employed to drive generator 20. For example, the drive system can be a direct drive or an indirect drive. In one example, the generator 20 is mounted closely adjacent the engine 12 and a drive assembly is utilized to transfer driving torque from the engine to the generator 20.

Figure 6:
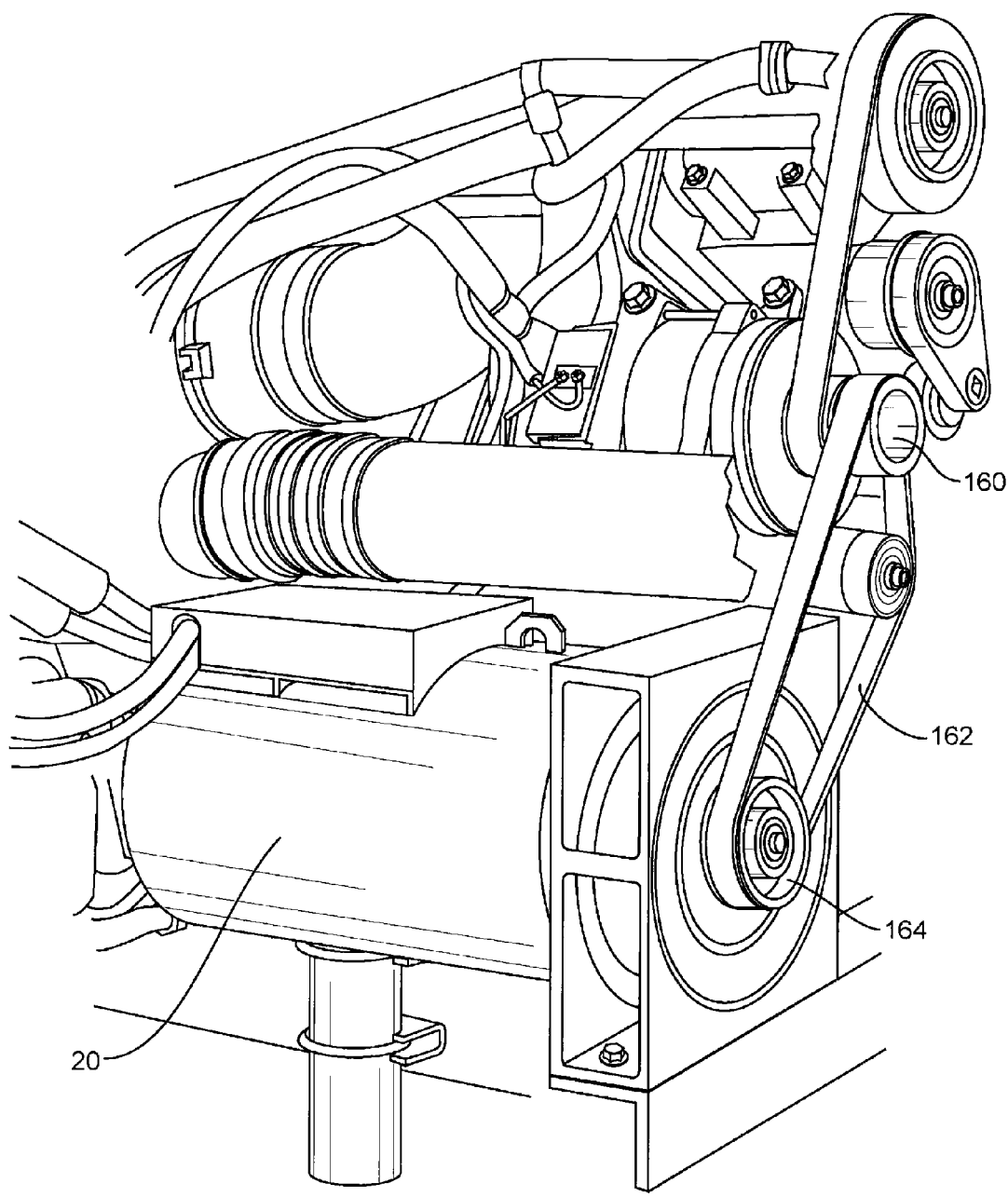
FIG. 6 is a fragmentary prospective view showing a portion of the drive system disposed adjacent the engine of the tractor, for a direct drive embodiment.

For example, FIG. 6 depicts a direct-drive arrangement where the accessory drive system of the engine 12 is used to turn the generator 20, via a serpentine belt arrangement. Advantageously, the drive belt may be driven from the engine's alternator pulley, or the like, and may include one or more tensioner pulleys to ease installation and removal operations.

More particularly, a sheave 160 is driven by the engine 12, such as from the engine's accessory drive system. The sheave 160 drives a drive belt 162, which couples to another sheave 164, which drives the generator 20. The sheave 164 may be configured to include an electric clutch for disengaging the generator 20 from the engine drive. Further, a belt tensioner may be used to maintain proper tension on the drive belt 162.

In other cases, the generator 20 may be driven off the tractor's transmission or directly or indirectly from a moving element of the tractor-refrigerated trailer unit such as a wheel of the tractor or a wheel of the refrigerated trailer. In other cases, the generator 20 may be mounted remotely from the engine 12 and driven by a drive system that includes an elongated drive shaft or drive shaft assembly such as an exemplary drive system as shown in FIGS. 7 and 8.

Figure 7:
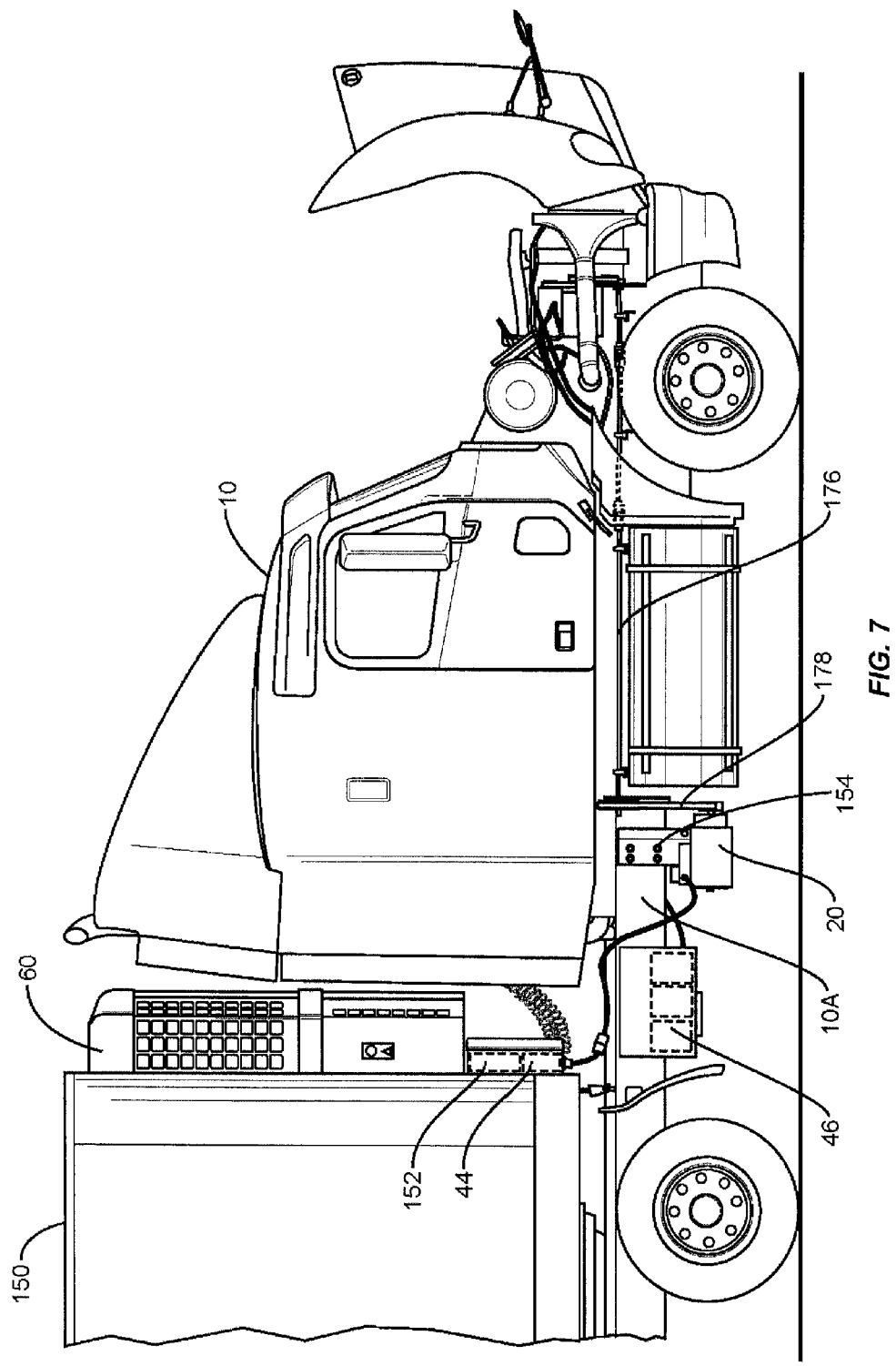
FIG. 7 is a fragmentary side elevational view of a tractor-refrigerated trailer unit showing an exemplary indirect drive system operatively interconnected between the engine of the tractor and a generator.
Figure 8:
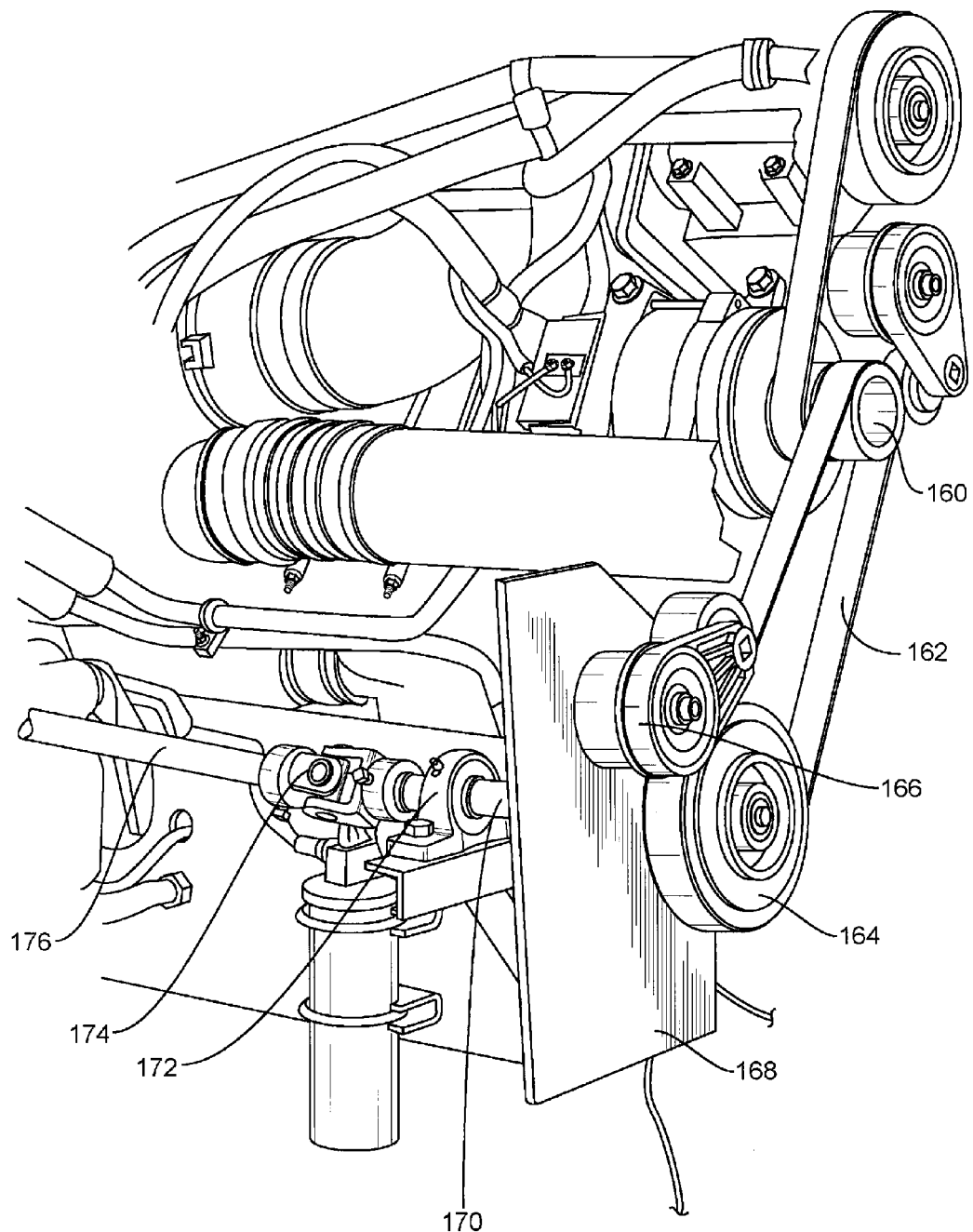
FIG. 8 is a fragmentary prospective view showing a portion of the indirect drive system of FIG. 7.

With particular reference to FIGS. 7 and 8, the tractor 10 is shown therein and connected to a tractor-refrigerated trailer 150. The refrigeration unit 60 described above and shown in FIGS. 1-3 is mounted to the front of the tractor-refrigerated trailer 150. As seen in FIG. 7, the APU batteries 46 are mounted in a battery carrier that is supported by the main frame 10A of the tractor 10. Further, the generator 20 is mounted on a mounting frame 154 which in turn is mounted to the main frame 10A of the tractor 10. However, it is appreciated, as discussed herein, that generator 20 can be mounted at various positions on the tractor 10 or on the tractor-refrigerated trailer 150.

A drive system is operatively interconnected between the engine 12 and the generator 20. As shown in more detail in FIG. 8, a driven sheave 160 is driven by the engine 12 and trained around the driven sheave is a drive belt 162 that is also trained around a sheave/clutch 164. A belt tensioner 166 is mounted to a mounting plate 168 adjacent the clutch 164 for maintaining an appropriate tension on the drive belt 162. Clutch 164 is also mounted on the mounting plate 168 and is operative to drive a stub shaft 170 that projects rearwardly from the mounting plate 168 and extends through a bearing 172. A u-joint 174 connects the stub shaft 170 to a main drive shaft 176 that extends from adjacent the engine 12 to a point rearwardly of the engine. See FIGS. 7 and 8. Along the main drive shaft 176 there can be provided numerous bearings for supporting the main drive shaft and the main drive shaft may be broken into sections and coupled together by various u-joints.

Best shown in FIG. 7, a belt 178 is operatively interconnected between the generator 20 and the main drive shaft 176. In the exemplary embodiment disclosed, a driven sheave is connected to the rear terminal end of the main drive shaft 176 and a driven sheave is connected to an input shaft associated with the generator 20. Belt 176 is trained around these sheaves and is operative to transfer torque for the main drive shaft 176 to the generator 20.

As demonstrated by the foregoing direct and indirect drive examples, there are numerous appropriate ways of driving the generator 20. In one case, the generator 20 is belt driven directly from the accessory drive system of the engine 1, while in another case, it is indirectly belt driven from an engine-driven shaft. Still further, the generator 20 can be driven directly through a gear drive without the need for a final belt drive. However driven, when the engine 12 is running, the generator 20 provides a highly efficient source of power for powering the refrigeration unit 60 and other electrical loads on the truck or trailer.

Figure 4:
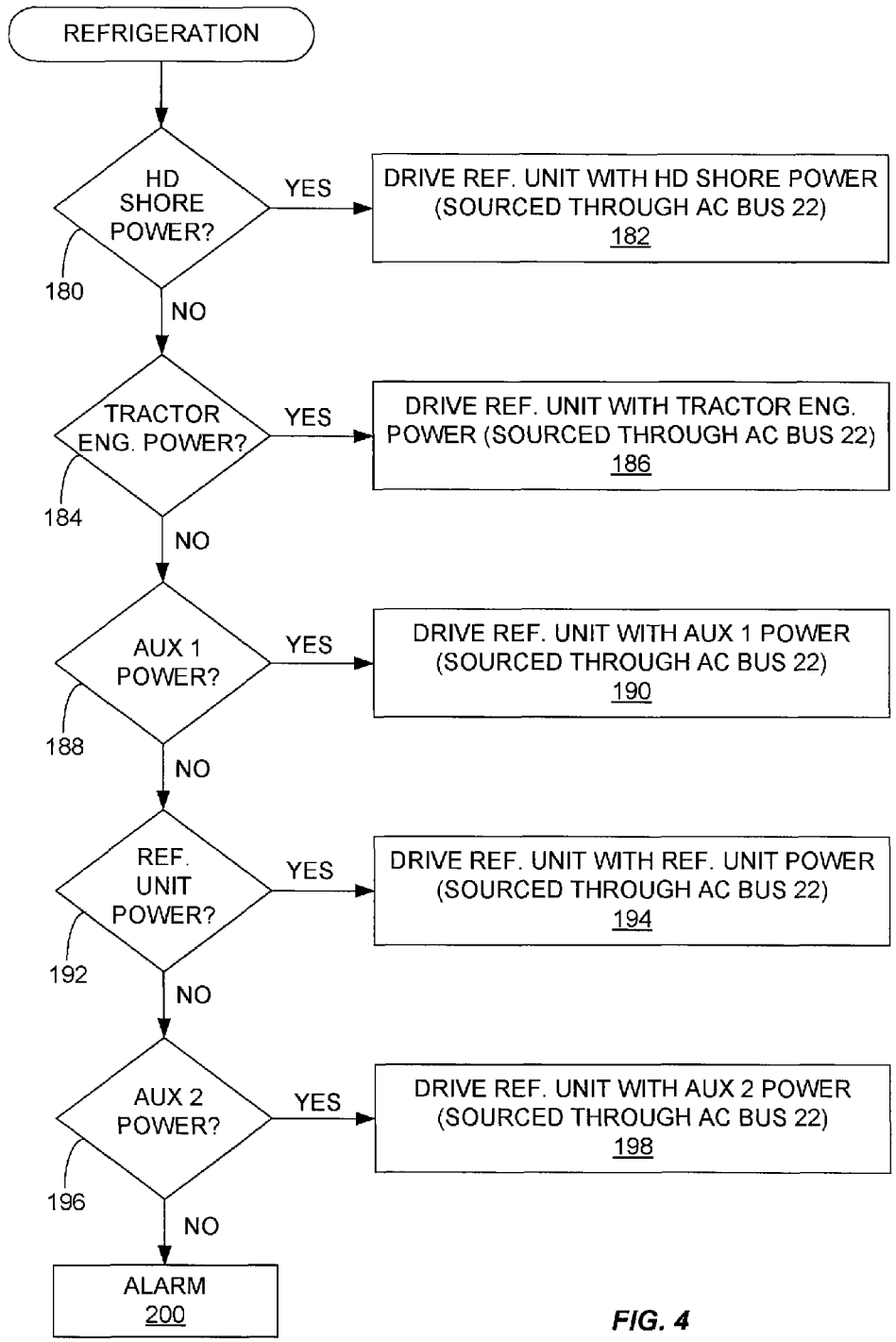
FIG. 4 is a flowchart showing the program logic for controlling the flow of power to the refrigeration unit.

With this in mind, FIG. 4 shows one embodiment of program logic for controlling and managing the power utilized by the refrigeration unit 60. First, the intelligent power management system determines if HD shore power is available (block 180). If yes, the refrigeration unit 60 is driven by the HD shore power (block 182). If HD shore power is not available, then the intelligent power management system looks to the tractor engine 12 for power (block 184). If the tractor engine 12 is running, then the power management system drives the refrigeration unit 60 via the generator 20 (block 186). Thus, in order of preference, either HD shore power or tractor generator power is directed to the bus 22, which in turn is operatively connected to a motor 68 or 124 of the refrigeration unit 60. The motor in turn drives the compressor 64 or 126 of the refrigeration unit.

It should be pointed out that in some embodiments, the load on the tractor engine 12 can be monitored and the program logic can take into account the tractor engine load when determining how to efficiently utilize power. For example, if the load being experienced by the tractor engine 12 is greater than a selected threshold value, then the program logic may elect to drive the refrigeration unit 60 with another source of power until the load of the tractor engine 12 falls below the threshold value. This is an optional approach to managing power inasmuch as it is contemplated that engine load will not in most cases impair or inhibit the ability of the generator 20 to power the refrigeration unit 60.

Returning to the illustrated method, if there is no HD shore power available and if the tractor engine 12 is not running, then the power management system looks to an auxiliary source of power to energize the bus 22, here denoted as AUX 1 (see block 188). AUX 1 power may refer to, for example, the three-phase 480 VAC power available from the inverter 102 shown in FIGS. 1-3. If AUX 1 power is available, then intelligent power management system energizes the bus 22 using AUX 1 power, and the refrigeration unit 60 is driven via motor 68 or 124 from the power sourced through bus 22 (block 190).

If there is no HD shore power available and if the tractor engine 12 is not running, and if AUX 1 power is not available, then the program logic can look to either the refrigeration engine 62 or 120 or to another auxiliary power, which may be available in some system designs, here denoted as AUX 2. The priority of these energy sources may vary depending upon the overall power management system and its components and particularly the ability of the system to store substantial energy in the auxiliary battery 100, or elsewhere. In the embodiment illustrated in FIG. 4, the refrigeration engine 62 or 120 takes priority over auxiliary power AUX 2, but not over auxiliary power AUX 1. This preference might be set because of, for example, differences in the energy storage capacity of the sources represented as AUX 1 and AUX 2, or because of differences in their criticality of use with respect to other vehicle systems.

In any case, one sees that if power from the refrigeration unit engine/generator set is available (block 192), that power is used to power the refrigeration unit compressor (block 194). Power from the refrigeration unit engine/generator can be accessed in various ways. In one example, the power produced by the refrigeration unit 60 is routed through the power management system and back to the refrigeration unit. In other cases, the power management system simply enables the refrigeration unit engine 62 or 120 to power the compressor 64 or 126 without routing the refrigeration unit power through the power management system. If power from the refrigeration unit 60 is not available, the intelligent power management system checks whether AUX 2 power is available (block 196). If so, it uses AUX 2 to energize the bus 22 and thereby power the refrigeration unit compressor 64 or 126.

Finally, if none of the potential energy sources for running the refrigeration unit 60 are available, then the intelligent power management system sounds an alarm (block 200).

Figure 5:
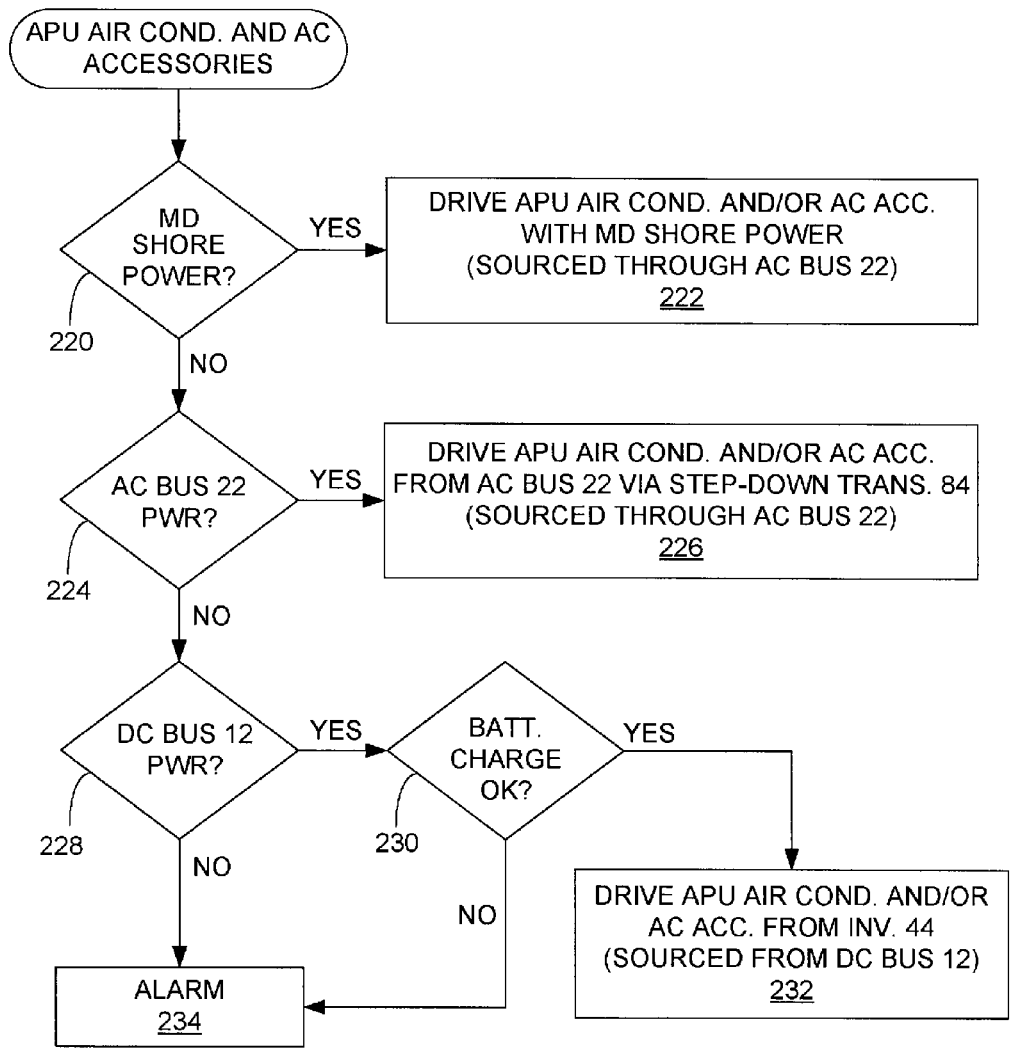
FIG. 5 is a flowchart illustrating the program logic for controlling the power utilized by an auxiliary power unit associated with the tractor-refrigerated trailer.

Turning to FIG. 5, depicted therein is one embodiment of programming logic for controlling the power directed to and utilized by the APU air conditioner 40 and the AC accessories 24. First, the intelligent power management system determines if MD shore power is available (block 220). MD shore power may be, for example, mains-generated 120 VAC power, and in one or more embodiments of the intelligent power system it a most-preferred source of power for energizing the bus 26 and thereby powering those AC loads coupled to the bus 26.

If MD shore power is available, the intelligent power management system drives the APU air conditioner 40 with such power, as sourced through the bus 26 (block 222). If MD shore power is not available, the power management system then looks to power from the bus 22. That is, as described in the context of FIG. 4, the intelligent power management system multiplexes multiple power sources—e.g., multiple sources of three-phase 480 VAC power—onto the bus 22, one at a time according to a defined power source preferences and power source availability.

As such, power for energizing the bus 26 is available from any one of the power sources that are available for energizing the bus 22. Power is transferred from AC bus 22 to AC bus 26 via the step-down transformer 84, which may make single-phase 120 VAC power from one or more phases of the three-phase 480 VAC power on the bus 22. Thus, if MD shore power is not available but power from the bus 22 is available (block 224), the intelligent power management system energizes the bus 26 via the step-down transformer 84 and thereby drives the APU air conditioner 40 and/or the AC accessories 24 (block 226).

If MD shore power is not available and no power is available for energizing the bus 22, one or more embodiments of the intelligent power management system are configured to energize the bus 26 from one or more inverters that derive AC power from batteries or other DC sources. For example, in at least one embodiment, the intelligent power management system generates AC power from the bus 18, subject to one or more state-of-charge checks for the primary battery 30 and/or APU battery 46.

For example, in one implementation, the intelligent power management system checks whether the bus 18 is energized (block 228). If so, it checks whether there are any low-charge indicators for the primary battery 30 and/or APU battery 46 (block 230). If not, indicating that the charge of the primary battery 30 and/or APU battery 46 is "ok," it energizes the bus 26 with AC power derived from the bus 18, and uses that power to drive the APU air conditioner 40 and/or the AC accessories 24 (block 232).

However, it should be noted in some embodiments, such as shown in FIGS. 1-3, that the APU inverter 44 does not couple into the bus 26, but rather makes only a local connection for powering the APU air conditioner 40. In such embodiments, the APU air conditioner 40 preferentially runs from power sourced through the bus 26, but reverts over to power from the APU inverter 44 whenever it needs to run and power from the bus 26 is not available.

Also, regardless of whether the intelligent power management system implements the flexible APU air conditioner and AC accessory control described above, it may be configured to monitor charge on the primary battery 30. If that charge falls below a prescribed threshold, the intelligent power management system effectively decouples the primary batteries 30 from the bus 18 such that these batteries will not be further discharged. As discussed above, this can be accomplished in various ways. As a practical matter, when the primary batteries 30 are decoupled from the bus 18 and coupled directly to the alternator 16, the power for driving the APU air conditioner 40 and AC accessories 24 may derived from the APU battery 46 and/or other storage batteries that might have available power and which are operatively connected to bus 18.

If there is no power source available for energizing the bus 22, then the intelligent power management system may sound an alarm (see block 234). Note that while not shown in FIG. 5, the auxiliary power outlet/inlet 86 shown FIGS. 1-3 also may provide a source of power for directly or indirectly energizing the bus 22, the bus 22, and/or the bus 18.

In any case, the control methods illustrated in FIGS. 4 and 5 can be implemented in hardware, software, or some combination of hardware and software. In one or more embodiments disclosed herein, the intelligent power management system includes a power management module or controller. The controller may be housed within an enclosure mounted on the tractor-refrigerated trailer 150, mounted in the tractor cab, or mounted elsewhere in or on the tractor 10, with interconnecting wiring used as needed between it and the refrigeration unit 60.

In either case, the power management in at least one embodiment includes program logic implemented in software, e.g., in a computer program product embodied or stored on a computer readable medium. The software is loaded on and executed by a computing device, such as programmable microcontroller, PLC, PLA, or any other type of programmable logic circuit, thereby specially adapting the computing device for carrying out the intelligent power management control contemplated herein.

Figure 9A:
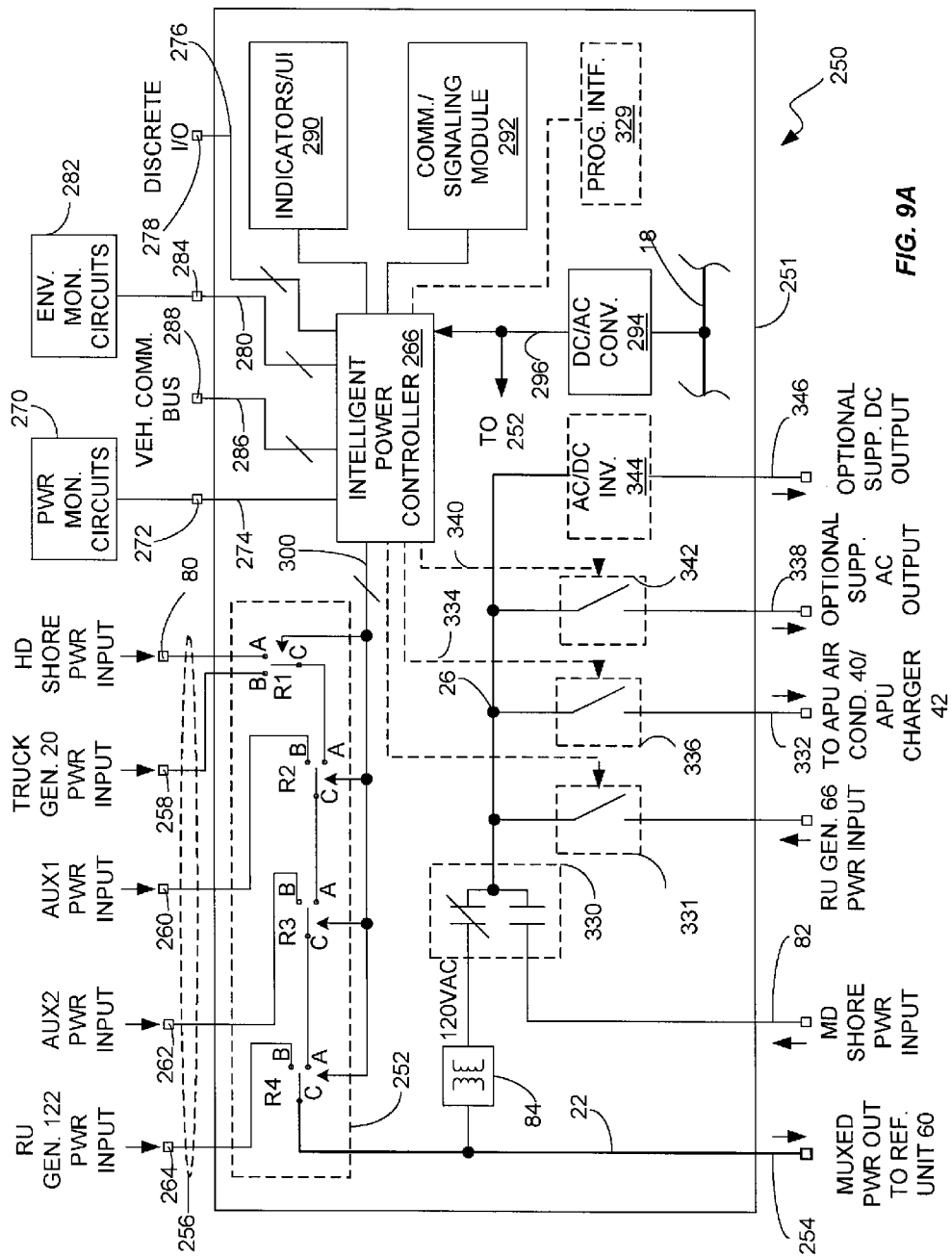
FIGS. 9A and 9B are simplified block diagrams illustrating alternative embodiments of the intelligent power management system.
Figure 9B:
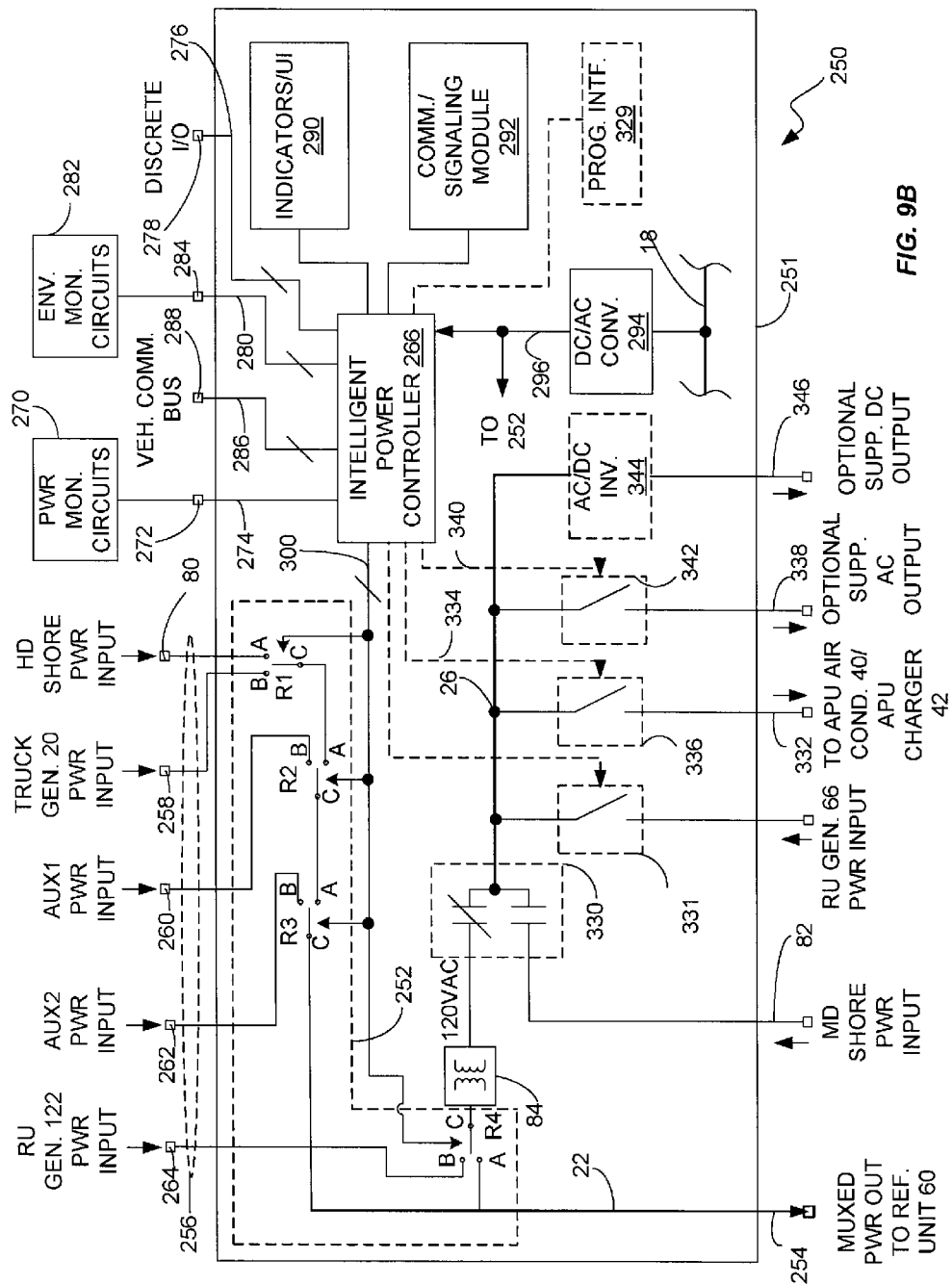
Figure 10A:
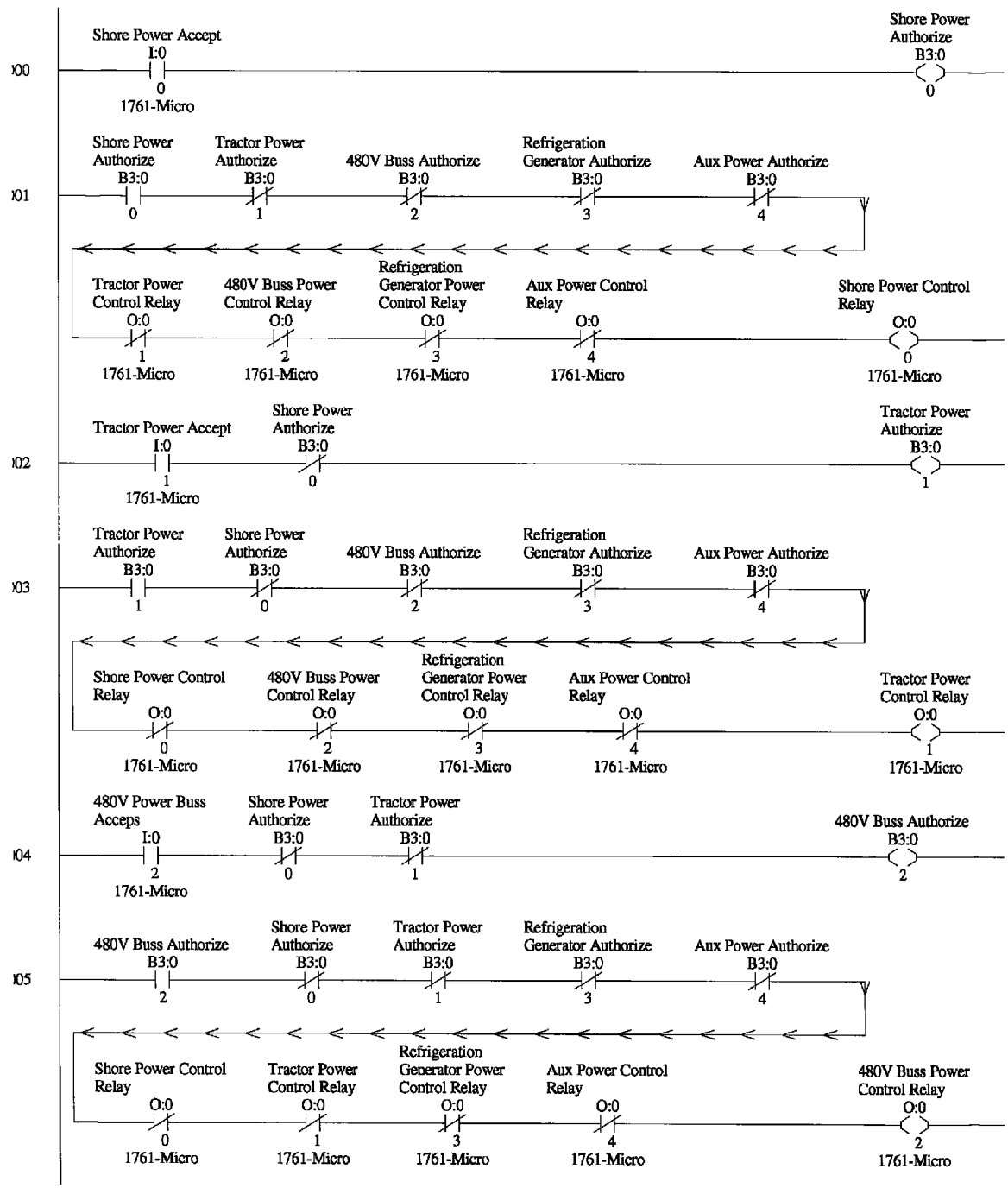
FIGS. 10A-10D are ladder logic diagrams illustrating power source selection control logic that is implemented by a PLC-based embodiment of the intelligent power management system.
Figure 10B:
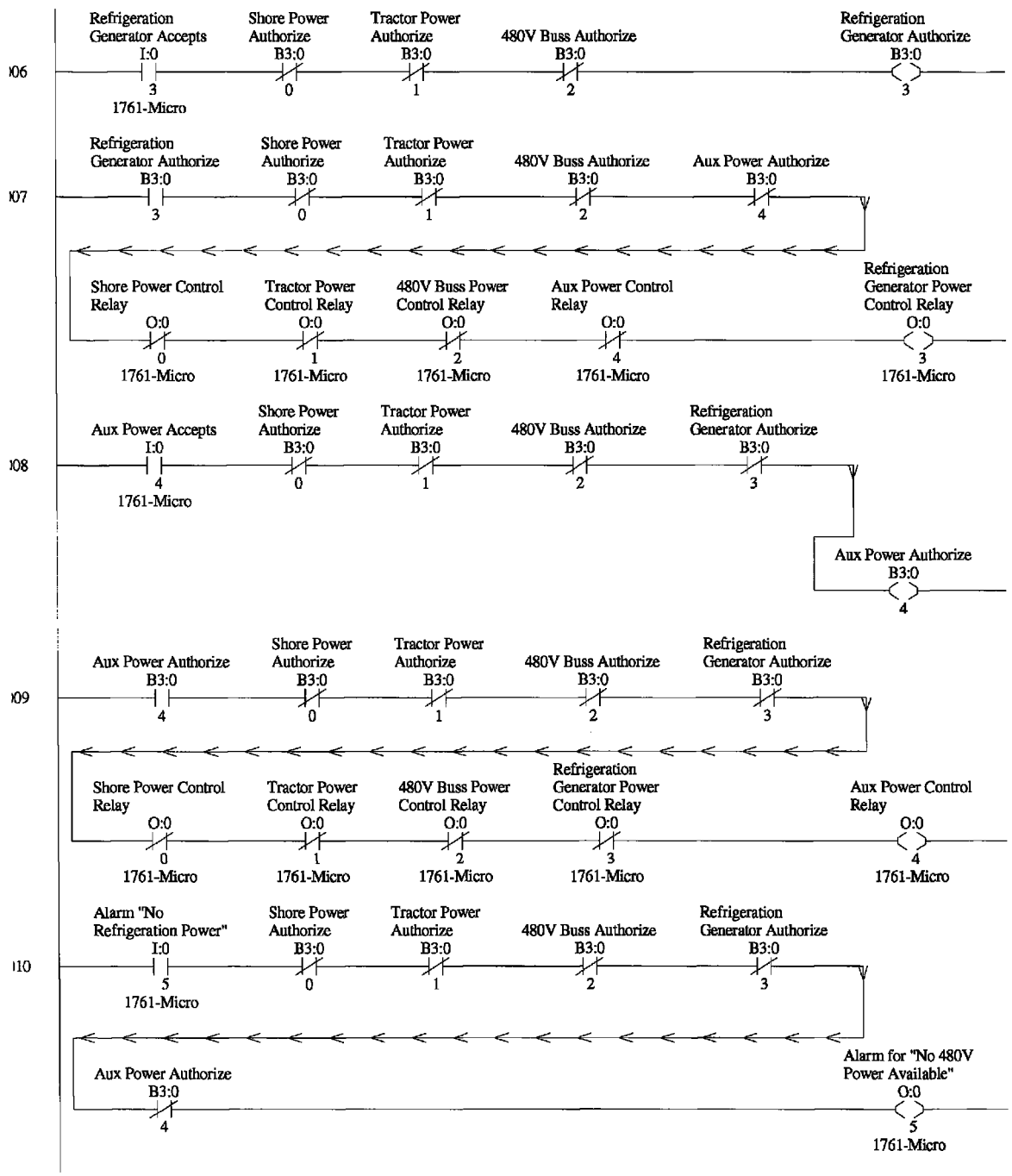
Figure 10C:
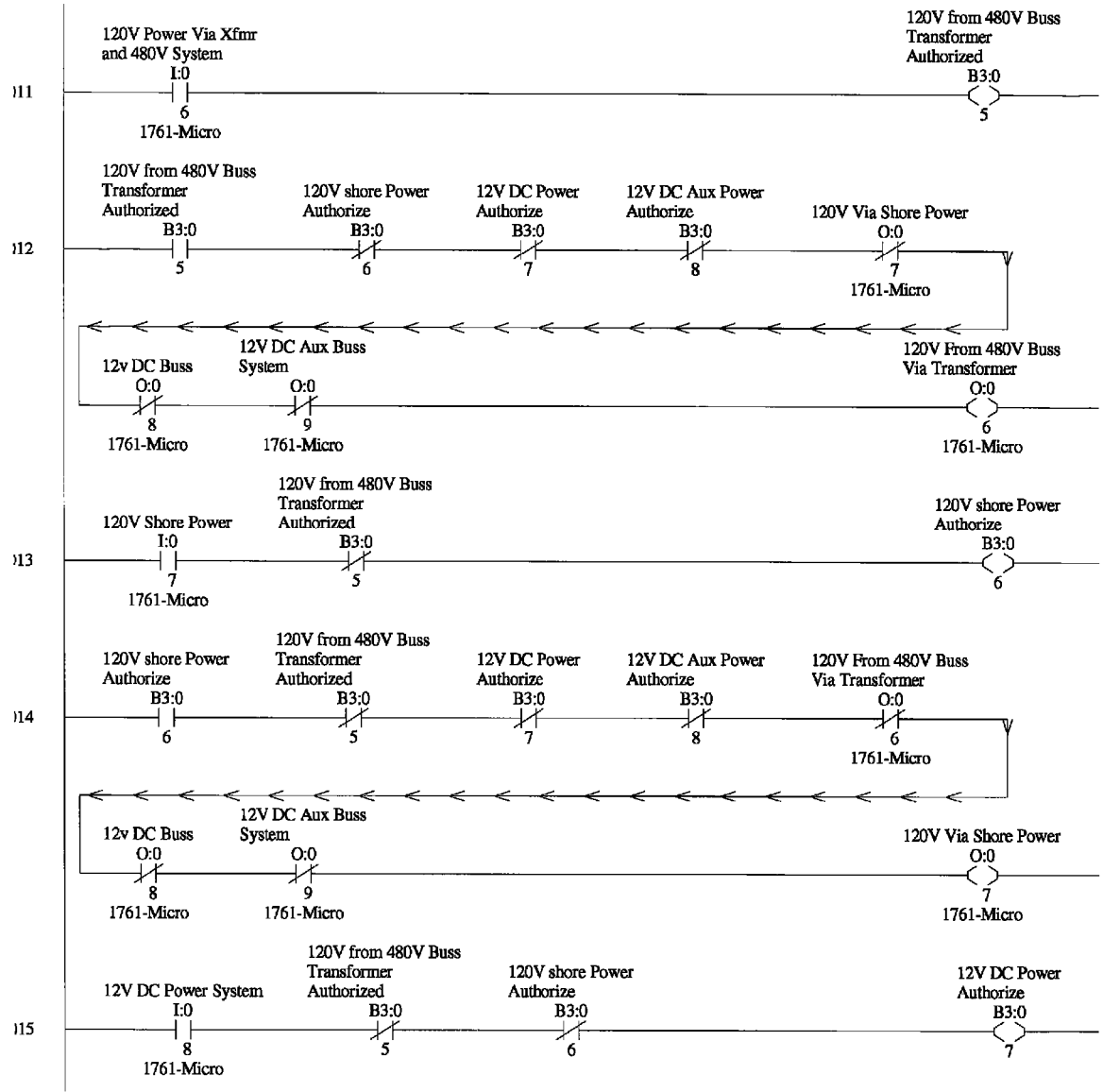
Figure 10D:
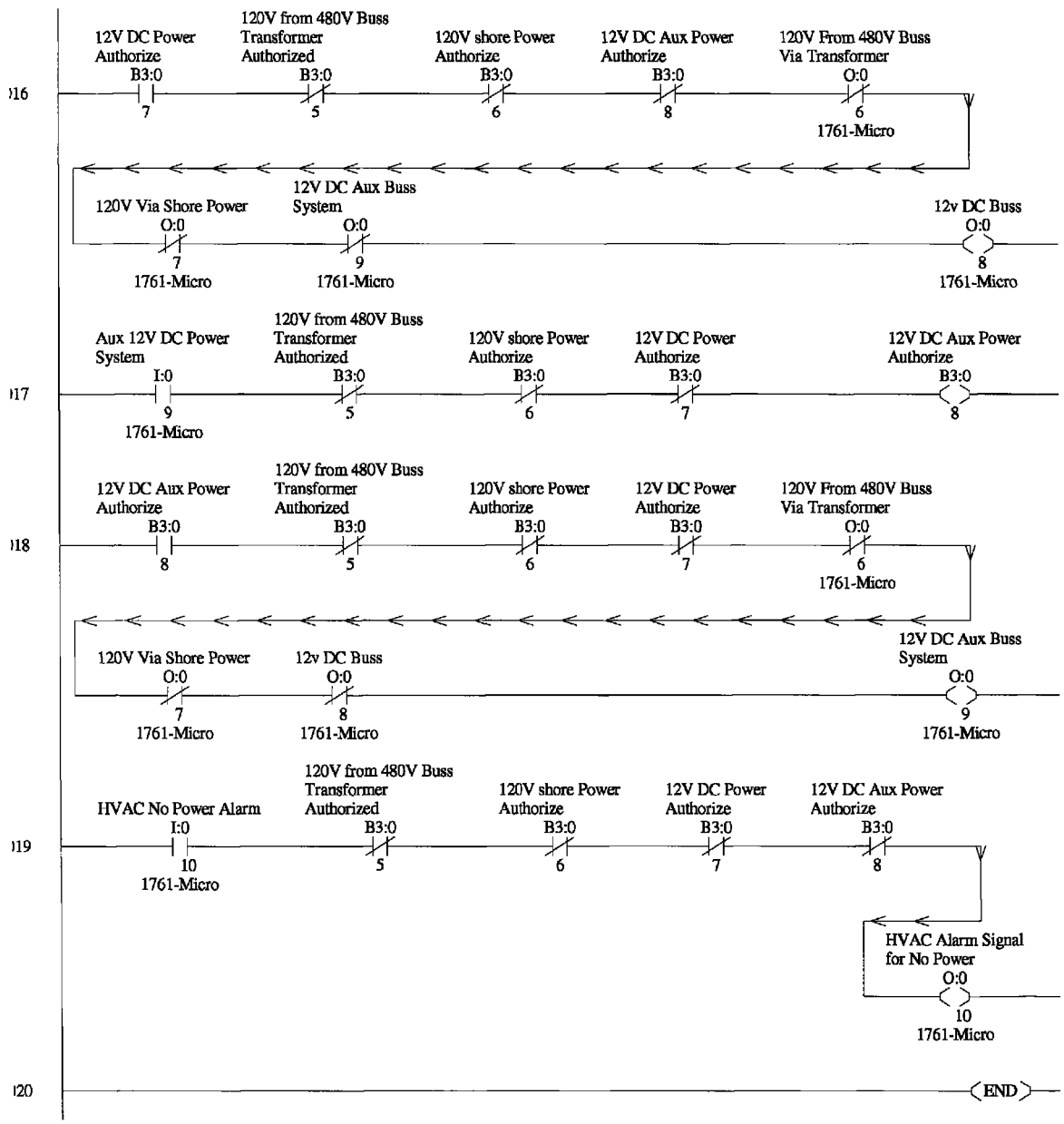

While FIGS. 1-3 generally introduced the various power buses and source/load interconnections contemplated for one or more embodiments of the intelligent power management system contemplated herein, FIGS. 9A-9B illustrate power management controller-based embodiments of an intelligent power management system, generally identified by the reference numeral 250. For ease of discussion, the intelligent power management system 250 will be referred to as the "IPMS 250," and it should be understood that the IPMS 250 is, in one or more embodiments, implemented as a installable unit, having a housing 251 with various physical connectors for its input and output connections—e.g., physical connectors for the HD shore power, MD shore power, etc.

In at least one such embodiment, the IMPS 250 uses physical connectors—e.g., plugs, ports, jacks, etc.—that conform to standardized truck wiring harnesses and electrical connectors. The IPMS 250 thus can be installed in or on a truck, as part of the manufacturing build process, but the IPMS 250 also can be retrofitted to preexisting trucks with minimum labor and expense. Of course, it is assumed that the generator 20 is added as part of the retrofitting effort, and that the refrigeration unit 60 is modified, as needed, to complement electric power management by the IPMS 250. For example, a given refrigeration unit may have been originally rigged to run only on its internally-generated electric power. That type of refrigeration unit is retrofitted by adding an IPMS-sourced electrical input to the refrigeration unit, along with a switch and associated control circuit that automatically switches the refrigeration unit's electric motor to the IPMS-sourced power input, whenever that input is "hot."

As illustrated in FIG. 9A, the IPMS 250 includes intelligently controlled switches (switching circuit) 252 that are dynamically controlled to select the most-preferred source of available power for powering the AC bus 22, and in turn powering the refrigeration unit motor 64 or 124 via a multiplexed power output 254. That is, the bus 22 is energized by multiplexing two or more independent sources of electrical power onto it, by controlling the switches 252, which may be a set of AC-powered contactors/relays. More particularly, the switches 252 are controlled so that only one of the available sources of independent power is operatively connected to the bus 22 at a time, meaning that the multiplexed power output 254 is energized by whichever power source is selected via the switches 252.

Given that various ones of the independent power sources may be available at different times, and given that they may have differing degrees of preference in terms of efficiency, pollution considerations, etc., the IPMS 250 can be understood as a dynamic source selector operating in real time to assess power source availabilities and correspondingly to select the "best" one of the available power sources for providing electrical power to the refrigeration unit 60. "Best" in this regard can be programmatically defined.

One sees HD shore power is among the independent sources of electrical power that are coupled into the switches 252. More particularly, in the illustrated embodiments, one sees set 256 of five example electrical connections: input connection 80 for receiving HD shore power; input connection 258 for receiving input power from the generator 20; input connection 260 for receiving input power from "AUX1," which may be sourced from the 3-phase inverter 102 shown in FIG. 2, for example; input connection 262 for receiving input power from "AUX2," which may be another source of electrical power suitable for powering the refrigeration unit 60; and input connection 264 for receiving input power from the generator 122 onboard the refrigeration unit 60.

Returning to the IPMS details, it will be understood that not all of the independent power sources input to the set 256 of power inputs will be available at all times. Here, "available" at least means present, which can be sensed with voltage detection circuits. In one or more embodiments, "available" means present and meeting defined power requirements. For example, 480 VAC power from the generator 20 may be deemed available by the IPMS's source selection logic if it is sensed as present, or, in a stricter sense, if it is sensed as present and falling within defined power factor quality, phasing, and voltage minimum/maximum limits. Thus, in one or more embodiments, the IPMS 250 includes and/or is associated with power presence-sensing/quality-monitoring circuits 270, and it may include an interface connection 272 for receiving power monitoring signals 274.

In any case, to the extent that more than one such power sources are simultaneously available, the IPMS 250 dynamically determines which one of those available sources to multiplex onto the bus 22, and thereby power the refrigeration unit 60 via the multiplexed power output 254. In one or more embodiments, the IPMS 250 includes an intelligent power controller (IPC) 266, which comprises a hardware and/or controller that generates one or more switching control signals 300, to control the multiplexing switches 252 and thereby control which power source applied to the set 256 of power inputs is selected for energizing the bus 22 and powering the refrigeration unit 60 via the multiplexed power output 254.

The IPC 266 orchestrates overall system control—i.e., overall operations of the IPMS 250 and any systems or subsystems controlled by the IPMS 250—based on manipulating the multiplexing switches 252, controlling various other switches, monitoring and/or asserting discrete input/output (I/O) signals 276 via an I/O interface connection 278. Such signals can includes status signals, such as various low-battery or other state-of-charge signals for the primary battery 30, the APU battery 46, etc.

The IPC 266 also may receive one or more environmental monitoring signals 280, such as ambient temperature, refrigeration compartment temperature, etc. These signals may be provided by one or more environmental monitoring circuits 282, which coupled to the IPMS 250 via a monitoring interface 284. The environmental monitoring circuits 282 may comprise sensors dedicated to the IPMS 250, or may be preexisting sensors already included on the tractor 10. Notably, the IPC 266 in one or more embodiments uses the one or more environmental monitoring signals 280 to dynamically modify or otherwise adapt the selection logic used to identify which one of the power sources applied to the set 256 of independent power inputs is considered as the most-preferred source for powering the refrigeration unit 60.

Still further, one or more embodiments of the IPMS 250 include a signal bus 286, which interfaces with the truck's standardized vehicle communications bus through an interface 288. This connection permits the IPMS 250 to receive and send various operational data associated with the truck's onboard computer systems, and thus represents a rich source of exchanging operational information and control data, including tractor engine data, GPS data, environmental data, etc.

Additionally, one sees that the illustrated embodiment of the IPMS 250 includes a user interface (UI) 290, including one or more indicators that may include one or more visible and/or audible indicators, for conveying status/fault/monitoring information. However, the IPMS 250 also may use its discrete I/O signals 276 and/or its vehicle communication bus signals 286 to convey such information to the vehicle operator through preexisting driver information systems, such as in-cab annunciator panels, computerized driver information screens, etc.

Still further, the IPMS 250 may include or otherwise be associated with a local communication module 292, to transmit signaling indicating alarm/fault events as needed, and to signal system status according to some programmed schedule. The local communication/signaling module 292 may include a WiFi or other unlicensed-spectrum radio transmitter, or may include a dedicated cellular radio modem, for transmission of data via one or more supporting cellular communication networks.

The local communication module 292 also may include a wired or wireless interface—e.g., USB, Bluetooth, etc.—that allows an operator to plug in a laptop or other communication device, to retrieve current and/or historical operating data and statuses from IPMS 250. Notably, whether the IPMS 250 receives GPS data from the truck, or includes its own GPS receiver, it can include GPS data when sending reporting information from its communication module 292, which is useful, for example, in providing location information along with reporting a refrigeration power fault. Reporting that data automatically, along with location information, increases the chances of timely saving the refrigerated cargo. As such cargo can be worth hundreds of thousands of dollars, or more, automated fault reporting is a valuable feature.

Additional illustrated features include a DC/AC converter 294, which is used to provide a "clean" source of AC power 296 within the IPMS 250, for powering the IPC 266 and for reliably powering any AC-powered relays/contactors, such as the multiplexing switches 252. In the illustrated embodiment, the DC/AC converter 294 is powered from the bus 18, meaning that the IPC 266 is provided with clean reliable power as derived from any of the DC sources that are operatively associated with the bus 18—see FIGS. 1-3 for examples. Note that this illustrated arrangement assumes that the IPC 266 is an AC-powered control module, such as a 120 VAC powered industrial PLC.

The noise immunity and power robustness gained by such an arrangement are advantageous, but it should be understood that the IPC 266 can be implemented as a DC-powered control system, such as 12 VDC powered PLC, or a microcontroller or single-board embedded computer system with its own dedicated power control and regulation. Even where the IPC 266 does not need clean AC power, it still may be desirable to configure the multiplexing switches 252 as AC-powered relays, and use the DC/AC converter 294 as a source of clean AC power for them. Of course, it is contemplated that some embodiments of the IPMS 250 will use DC-powered relays for multiplexing switches 252 and, in such embodiments, the DC/AC converter 294 will be omitted.

Regardless of the particular implementation details adopted in a given embodiment of the IPMS 250, it will be appreciated that the IPMS 250 selects the best or otherwise most-preferred one among a number of independent power sources, for powering the refrigeration unit 60. In this manner, the IPMS 250 performs dynamic power source selection based on evaluating the available power sources in view of defined preferences, so that the refrigeration unit 60 is, if possible, powered from a better, more efficient source of electrical power than is available from its generator 122.

To do so, the IPC 266 dynamically identifies a most-preferred one of the available power sources based on, for example, programmed selection preferences that define power source selection preferences in descending order of power source efficiencies. With this approach, the IPC 266 controls the multiplexing switches 252 to select the most efficient one of the available power sources, for powering the refrigeration unit 60. As a non-limiting example, FIG. 9A illustrates five power sources identified individually coupled to the inputs 80, and 258, 260, 262, and 264 included in the set 256 of power inputs.

It will be understood that, in one or more embodiments, each one of these sources represents a selectable source of 480 VAC, three-phase electrical power, and the IPC 266 multiplexes them one at a time onto the bus 22, based on controlling the switches 252. For example, the illustration depicts the switches 252 as a cascaded set of relays R1 through R4.

Using that arrangement of relays, the IPC 266 energizes the bus 22 from the HD shore power source via the HD shore power input 80 by setting each of the R1 through R4 relays to connect its A-C terminals. Relay control signals 300 as output by the IPC 266 provide for the desired relay control. To energize the AC bus 22 from the generator 20 via the power input 258, the IPC 266 causes the relay R1 to connect its B-C terminals, while setting or maintaining the A-C terminal connections for the relays R2-R4. Similarly, to energize the AC bus 22 from the AUX1 power source via the power input 260, the IPC 266 causes the relay R2 to connect its B-C terminals, while setting or maintaining the A-C terminal connections for the relays R3 and R4. Likewise, to energize the AC bus 22 from the AUX2 power source via the power input 262, the IPC 266 causes the relay R3 to connect its B-C terminals, while setting or maintaining the A-C terminal connections for the relay R4. Finally, to energize the AC bus 22 from the refrigeration unit's generator 122 via the power input 264, the IPC 266 causes the relay R4 to connect its B-C terminals.

However, not all embodiments of the IPMS 250 route the electrical output from the refrigeration unit generator 122 to the multiplexing switches 252 for delivering power to the 480 VAC bus 22. Indeed, routing power via the 480 VAC bus 22 is unnecessary when delivering power from the refrigeration unit's onboard generator 122 back to the refrigerator unit 60 itself. In embodiments that do not route the refrigeration unit's onboard generator power to the IPMS 250 for control, the refrigeration unit 60 includes a switch circuit configured to switch the refrigeration unit's motor 124 between IPMS-sourced power and power from the generator 122. Such a switch circuit can be retrofitted to the refrigeration unit 60, as part of equipping a given refrigeration truck with the IPMS 250.

Of course, routing the electrical output from the refrigerator unit generator 122 to the multiplexing switches 252 does provide, for example, additional flexibility for deriving power for the 120 VAC bus 26 (e.g., to deliver power to power consuming components other than the refrigerator unit 60 itself). In certain embodiments, therefore, the IPMS 250 is configured to deliver power from the refrigerator unit generator 122 to the bus 26, but not to the multiplexed power output 254. FIG. 9B illustrates one example of this embodiment.

In FIG. 9B, power is routed in the same manner as that in FIG. 9A for all power sources except for the refrigeration unit's generator 122. That is, to energize the AC bus 22 from any of power inputs 80, 258, 260, or 262, the IPC 266 causes the relay R4 to connect its A-C terminals. When this occurs, power is routed from any of these power inputs to the multiplexed power output 254 and the 120 VAC bus 26 via the transformer 84 (just as in FIG. 9A). Alternatively to FIG. 9A, however, when the IPC 266 causes the relay R4 to connect its B-C terminals, power is routed from the refrigeration unit's generator 122 to the 120 VAC bus 26, without unnecessarily delivering power back to the refrigerator unit 60 via the multiplexed power output 254.

It will be appreciated that either of these arrangements operatively connects the multiple power sources to the bus 22 one at a time, based on the IPC 266 controlling the switches 252, which is regarded herein as multiplexing those power sources onto the bus 22. FIGS. 10A through 10D illustrate a non-limiting example of a PLC program that is implemented by the IPC 266, for one embodiment of such multiplexing as a function of power source preferences and availabilities.

The implemented program logic deals with multiple, possible sources of power for running the refrigeration unit's motor 124. In order of preference for this program example, those sources of power are HD shore power (e.g., 480 VAC), tractor generator power, "bus" power (which denotes AUX1 or AUX2 power), refrigeration unit generator power, and "aux." power (which denotes the other one of the AUX1 or AUX2 power). As such, it will be understood that AUX1 and AUX2 correspond to different sources of 480 VAC power, where "bus" power is more preferred than power from the generator 122 and "aux." is less preferred.

Turning from the example PLC program back to example IPMS details, FIG. 11 illustrates a generalized case where the switches 252 appear as a multiplexer/switch array that connects a selected one of the power sources 1 through n that are applied to the set 256 of power inputs to the AC bus 22. The IPC 266 provides the selection control signal(s) 300 needed for manipulation of multiplexer/switch array. Those skilled in the art also will appreciate that mechanical, make-before-break relays may represent an advantageous implementation for the switches 252, but they can be partly or wholly implemented using solid-state power electronics.

FIG. 12 illustrates another variation, where an inverter 310 provides power conditioning and/or power evaluation for one or more of the power sources, generically denoted as "SOURCE x" in the drawing. For example, the inverter 310 may be an "intelligent power" inverter/conditioner included in or associated with the IPMS 250. As an example of that role, the inverter 310 conditions power from the generator 20, before it is input to the switches 252 for multiplexed selection. Thus, the inverter 310 advantageously can be used to "clean up" power from the generator 20, by ensuring proper phase ordering, etc. The inverter 310 also can provide power quality indicators to the IPC 266, for any power sources that it preconditions for multiplexing use by the IPC 266.

The IPC 266 also represents another area of variation in system implementation. As a general proposition, the IPC 266 is a controller that is specially adapted for orchestrating power management in keeping with the top-level goals set for the IPMS 250. In this regard, the IPC 266 may be a purpose-built control circuit. On the other hand, at least part of the IPC 266 may comprise a commercial-off-the-shelf processing system that is specially adapted via one or more computer programs. In either case the IPC 266 is specially adapted for intelligent power management through hardware and/or software, and through its wiring interconnections.

As shown in FIG. 13, in one or more embodiments the IPC 266 comprises a Programmable Logic Controller (PLC) or other programmable control circuit that includes a microprocessor 312, along with associated memory 314. As a non-limiting example, the IPC 266 comprises or otherwise includes an ALLEN-BRADLEY MICRO-LOGIX PLC.

Further, in at least one embodiment, the memory 314 comprises more than one memory device and/or more than one type of memory. For example, it may include non-volatile EEPROM or FLASH memory for storing computer program instructions 316 and various configuration data 318, and it may include SRAM, DRAM, or another type of working, scratch-pad memory for supporting live execution of the computer program instructions 316 and associated variable storage for power monitoring indicators, etc.

Further, one or more Input/Output (I/O) circuits 320 may be associated with the microprocessor 312, for interfacing system-level input/output signals to the microprocessor 312. In this capacity, the I/O circuits 320 comprise any one or more of voltage level shifting circuits, electro-static discharge protection circuits, current-to-voltage conversion circuits, analog-to-digital conversion circuits, etc.

Figure 14:
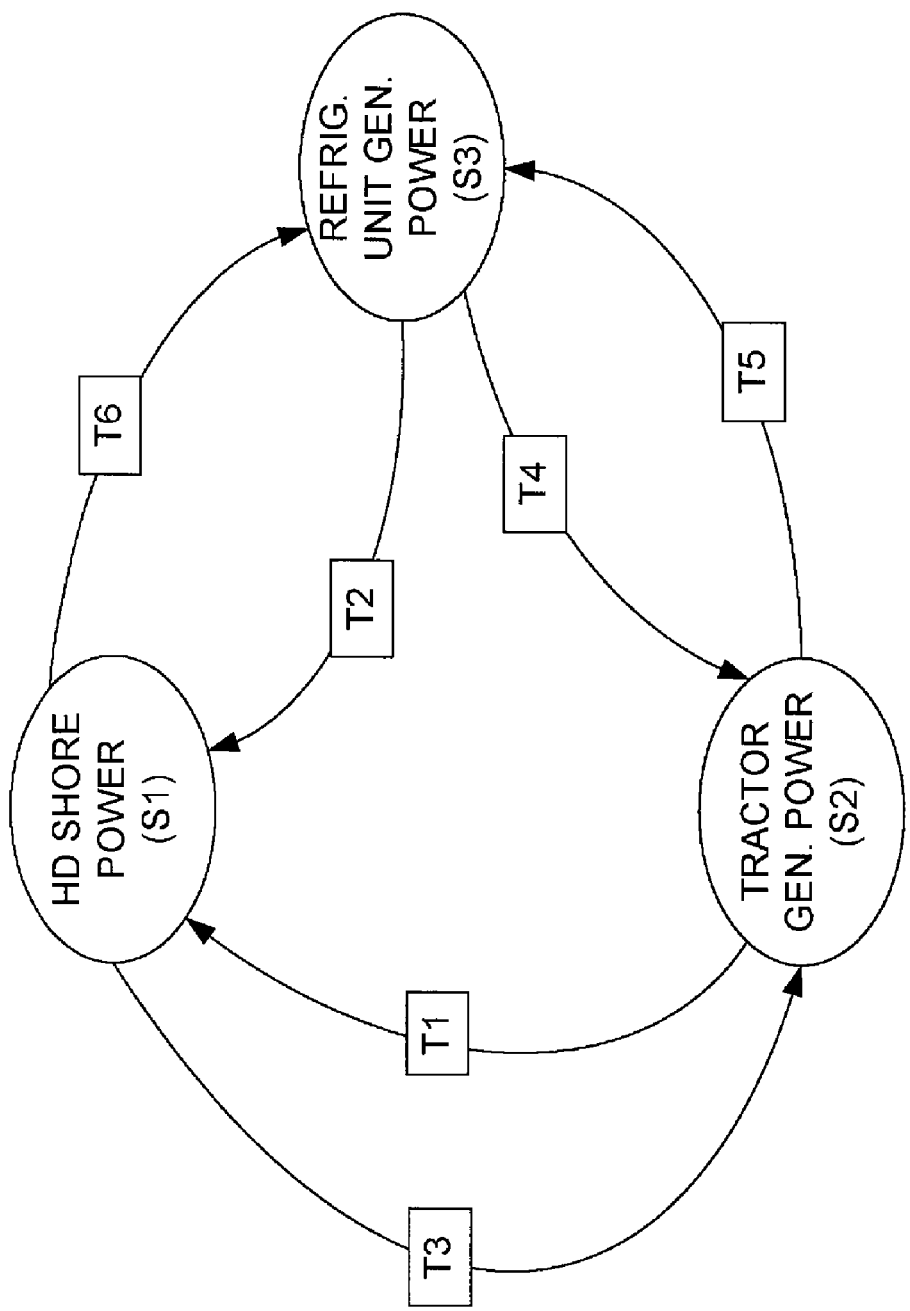
FIG. 14 is a state diagram of power source selection control, for an embodiment of the intelligent power management system.

Regardless of the above implementation details, those skilled in the art will appreciate that one or more embodiments of the IPC 266 operate as a state machine with respect to the selection of which power source is used to drive the refrigeration unit motor 124. FIG. 14 illustrates a three-state example implementation of such control. In the illustration, "S" denotes a state, and there are three states labeled as S1, S2, and S3. Assuming that the motor 124 operates from 480 VAC power, state S1 represents operation of the refrigeration unit motor 124 from 480 VAC shore power. State S2 represents operation of the refrigeration unit motor 124 from 480 VAC, as supplied by the generator 20. State S3 represents operation of the refrigeration unit motor 124 from 480 VAC, as supplied by the generator 122, which is driven by the refrigeration unit engine 120.

Further in the illustrated diagram, "T" denotes a transition from one state to another, and there are six transitions labeled as T1 through T6. These transitions are driven by the programmed configuration of the IPC 266, and in this example the IPC 266 is programmed to prefer 480 VAC shore power over 480 VAC tractor generator power, and to prefer 480 VAC tractor generator power over 480 VAC refrigeration unit generator power. Accordingly, the IPC 266 undergoes transition T1 from state S2 to state S1, if HD shore power becomes available while the IPC 266 is operating in state S2. Similarly, the intelligent power controller undergoes transition T2 from state S3 to state S1, if HD shore power becomes available while the IPC 266 is operating in state S3. Note that power becoming "available" means that a given power source is present and meets whatever power quality conditions are imposed on it.

Continuing with the illustrated state transition logic, the IPC 266 further undergoes the following, conditional state transitions from the illustrated states: transitions T3 and T4 occur if 480 VAC is not available from HD shore power but is available from the generator 20; transitions T5 and T6 occur if 480 VAC power is not available from HD shore power or the generator 20 but is available from the generator 122. In support of this processing, it will be understood that the IPC 266 includes control signaling, if any such signaling is needed, to initiate startup of the refrigeration unit engine 120 upon sensing no availability of 480 VAC from HD shore power or from the generator 20. With temporary reference back to FIG. 9A, such signaling may be part of a set of discrete I/O signals 276.

The IPC 266 also may be configured to wait for a programmed time after initiating refrigeration unit engine start, before testing for the availability of 480 VAC power from the generator 122. That is, upon sensing the lack of 480 VAC power from either HD shore power or the generator 20, the IPC 266 may carry out a sequence of timed actions, beginning with engine start initiation for the refrigeration unit 60, waiting for a defined time-out interval to sense the qualified presence of 480 VAC from the generator 122, and then undertaking transition T6 from state S1 to state S3, or undertaking transition T5 from state S2 to state S3. In other embodiments, the IPMS 250 does not route power from the generator 122 through its control logic, but rather leaves that internal to the refrigeration unit 60 and simply provides external power to the refrigeration unit 60, to the extent that such power is available for multiplexing to the refrigeration unit 60.

Also, it should be noted that a fourth, alarm state may be used, which the IPC 266 transitions into in response to finding no available source of 480 VAC power for the refrigeration unit 60. Again referring to FIG. 9A, the IPC 266 may generate one or more alarm signals as part of its discrete I/O signals 278 and/or it may activate one or more alarm/fault indicators included in its UI 290. The indicators may be visible and/or audible. Still further, the IPC 266 may use its local communication module 292, to transmit signaling indicating alarm/fault events as needed, and to signal system status according to some programmed schedule.

The local communication/signaling module 294 may include a WiFi or other unlicensed-spectrum radio transmitter, or may include a dedicated cellular radio modem, for transmission of data via one or more supporting cellular communication networks. The local communication module 292 also may include a wired or wireless interface—e.g., USB, Bluetooth, etc.—that allows an operator to plug in a laptop or other communication device, to retrieve current and/or historical operating data and statuses from the IPMS 250.

Of course, one or more embodiments of the IPMS 250 make all or part of such information available to remote systems via transmissions from the local communication/signaling module 292. The IPC 266 in such embodiments is configured to log data in response to fault/alarm events and/or as part of a historical data logging routine. For example, the IPC 266 is configured in one or more embodiments to log the availabilities of various power sources and to track how long the refrigeration unit motor 124 was powered from each given 480 VAC power source. The IPC 266 processes this information and/or provides for its transfer to an external computer system for processing. Such data is necessary, or at least useful, in determining long-term fuel savings associated with running the refrigeration unit motor 124 from the most efficient one of the available 480 VAC power sources, and may be required for pollution compliance monitoring, etc., where minimizing the amount of time that the refrigeration unit engine 120 runs is a key aspect of compliance with NOX or particulate emissions requirements.

Supporting such logging, the communication module 292 includes a GPS receiver in one or more embodiments, for providing positioning data to the IPC 266. Such data can be logged as part of recording what 480 VAC sources were used for running the refrigeration unit motor 124—e.g., when, where, and for how long. GPS data also may be used in conjunction with alarm/fault reporting. In other embodiments, as noted, positioning data is provided to the IPC 266 through the vehicle communication bus 286. This latter embodiment is economical because it avoids duplication of GPS hardware, if the tractor 12 already has GPS onboard.

It will also be understood that the signals 274 from the power monitoring circuits 270 illustrated in FIG. 9A can be used to drive state transitions by the IPC 266, based on its determination of power source availabilities from such signals. Further, in at least one embodiment, the state control logic of the IPC 266 considers variables in addition to power source availabilities when making its state control decisions. For example, FIG. 9A depicts one or more environmental monitoring signals 280 from monitoring circuits 282. Such circuit(s) include, for example, ambient temperature monitoring, and it will be understood that the order of preference used to select power sources for powering the refrigeration unit motor 124 can be dynamically changed or otherwise updated, according to environmental inputs.

For example, in one embodiment, the IPC 266 is configured to receive a digital or analog ambient temperature signal from a monitoring circuit. The IPMS 250 may include a voltage or current source for powering the temperature sensing circuit. In other embodiments, the IPMS 250 includes its own ambient temperature sensing circuit. Still further, in at least one embodiment, ambient temperature and, optionally, additional environmental and vehicle operational data are provided to the IPC 266 via the vehicle communication bus 286. The communication bus 286 may be a Controller Area Network (CAN) bus, or another type of vehicular systems communication bus that carries various monitoring, status, and performance data between the vehicle's onboard microprocessors.

In any case, the additional data provides for more sophisticated power management control by the IPMS 250. As one example, the IPC 266 predicates its preference for power from the generator 20 over power from the refrigeration unit engine 120/generator 122 according to the current ambient temperature. See FIG. 15 for an example of such temperature-driven power multiplexing control.

Figure 15:
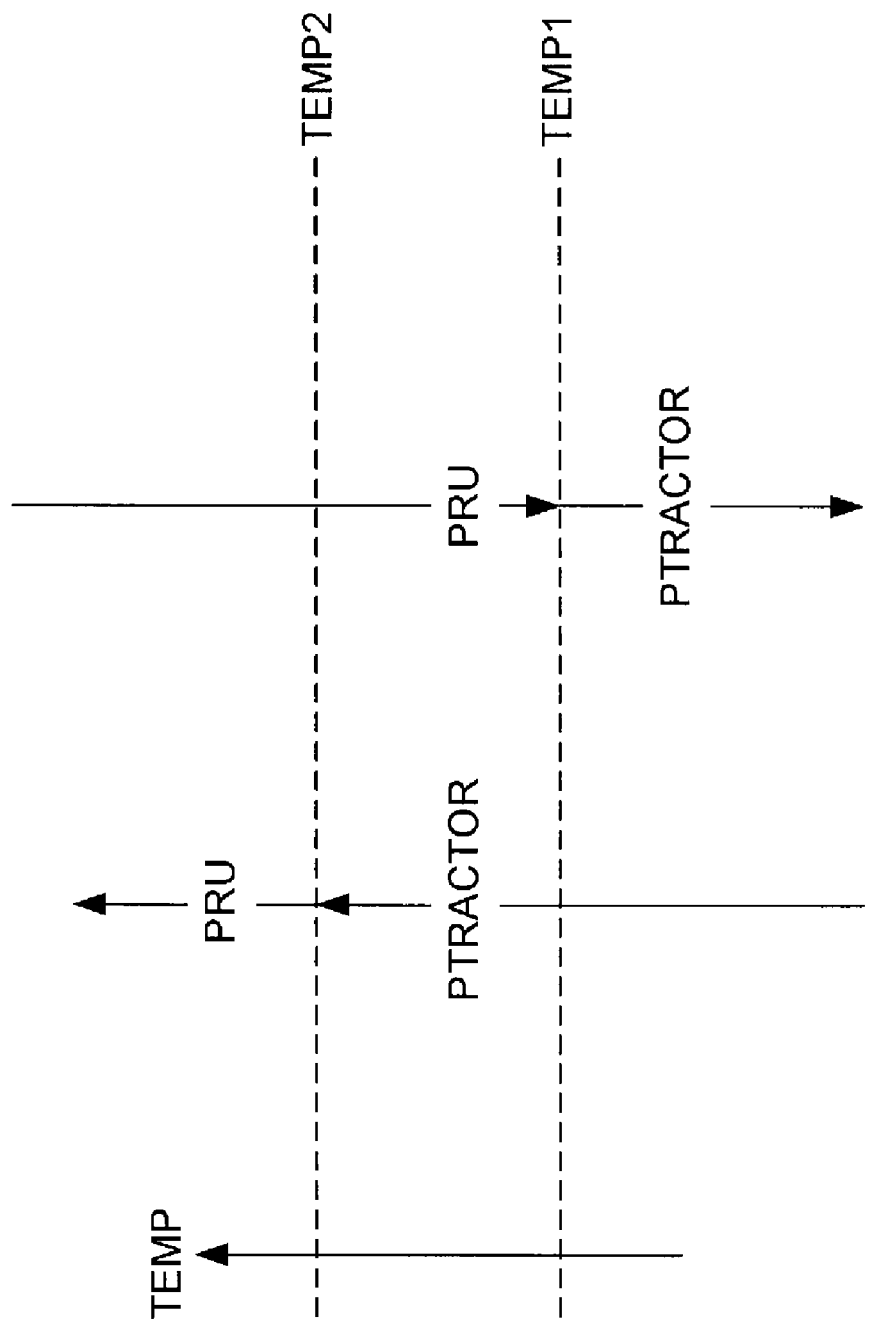
FIG. 15 is a diagram of temperature thresholds and associated power sources selection qualifications that are implemented by an embodiment of the intelligent power management system as part of its power source selection logic.

FIG. 15 presents a case where, as between the generator 20 and the generator 122, the generator 20 is preferred for use when ambient temperature is at or below a temperature threshold TEMP1. Conversely, the generator 122 is preferred for use when the ambient temperature is at or above TEMP2. By way of non-limiting example, TEMP1 is 32 degrees F., and TEMP 2 is 35 degrees F. As a more general proposition, as it becomes colder, the efficiency and/or pollution performance of the generator 20 run by the combustion engine 12 beats that of the generator 122 run by the engine 120.

While TEMP1 and TEMP2 can be set to the same value, separating them by at least a few degrees provides desirable control hysteresis. Control hysteresis as applied here prevents ping-ponging between voltage source selections at times when the ambient temperature hovers around a given switching threshold. For example, from the figure, one sees that operation from PTRACTOR (generator 20 power) continues as ambient temperature rises up through TEMP1, until ambient temperature meets or exceeds TEMP2. At that point, the IPC 266 switches over to operation from PRU (generator 122 power). Conversely, one sees that operation from PRU continues as ambient temperature falls through TEMP2, until ambient meets or falls below TEMP1. At that point, the intelligent controller 152 switches over to operation from PTRACTOR.

It will be understood that the IPC 266 in one or more embodiments is configured to initiate the changeover from PTRACTOR to PRU based on outputting control signaling as needed to initiate startup of the refrigeration unit engine 120, or such signaling as is needed to cause control switching in the refrigeration unit 60 to revert from external power (as supplied by the IPMS 250) to its internal engine 120/generator 122.

Further, changeover control logic in the IPMS 250 may be programmed with an appropriate delay after refrigeration unit engine initiation, during which the generator 122 assumes stable operation. In at least one embodiment, the IPC 266 is configured to initiate the refrigeration unit's running from the generator 122, and correspondingly begin monitoring a power quality indicator for 480 VAC power from the generator 122. If good power is not available within a defined time period after such initiation, the IPC 266 considers PRU as faulted and it maintains PTRACTOR-based operation of the refrigeration unit motor 124—at least where power from the generator 20 is still available.

Figure 16:
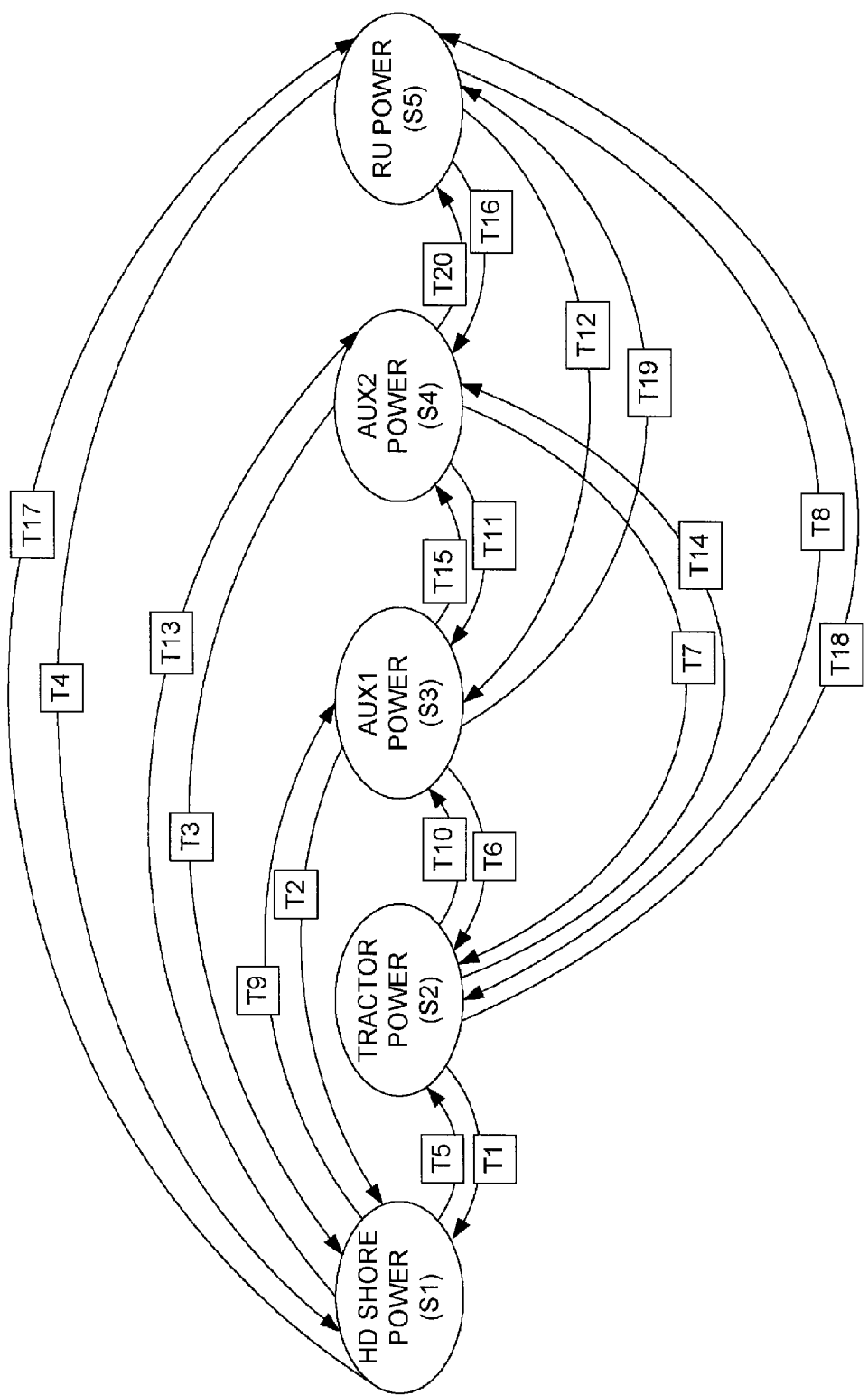
FIG. 16 is another state diagram of power source selection control, for an embodiment of the intelligent power management system.

These more nuanced, multi-variable considerations of power source preference can be extended to include additional environment and vehicle performance variables, and to consider multiple sources of power. For example, FIG. 16 illustrates a five state diagram, where each of the five states corresponds to operation from a given one of the power sources depicted in FIG. 9A, for input to the multiplexing switches 252.

In the below description of state transition logic for FIG. 16, 480 VAC from HD shore power is most preferred, and 480 VAC from the generator 122 is least preferred. In between these preferences, power from the generator 20 is more preferred than AUX1 power and AUX1 power is more preferred than AUX2 power. Again, AUX1 may come from one onboard battery pack, while AUX2 may come from another onboard battery pack.

Operation from 480 VAC shore power is labeled as state S1, operation from 480 VAC tractor generator power is labeled as state S2, operation from 480 VAC AUX1 power is labeled as state S3, operation from 480 VAC AUX2 power is labeled as state S4, and operation from 480 VAC refrigeration unit power as state S5.

Those skilled in the art will appreciate that other preference schemes may be used, and that different preference schemes may be used at different times. It also should be noted that a desired preference scheme can be "hard-wired", such that an installer or maintenance worker connects 480 VAC power source wiring to terminals of the IPMS 250, that are pre-designated according to order of preference. In other embodiments, the preference given to power sources is programmable, meaning that the order of power source preference used by the IPMS 250 can be configured by a system installer and, in some embodiments, updated on the fly, or at least during a configuration mode. For example, referring back to FIG. 9A momentarily, one sees that the IPMS 250 optionally includes a programming interface 329, which can be used for uploading program and configuration data to the IPMS 250, and downloading operational/historical data from the IPMS 250.

With these points of variation in mind, the example state logic depicted in FIG. 16 includes the following transitions with respect to determining how best to provide 480 VAC power to the refrigeration unit motor 124. Transitions T1-T4 occur whenever HD shore power becomes available, meaning that the IPC 266 transitions into state S1 from any of states S2, S3, S4, and S5, in response to detecting that HD shore power has become available.

Further, if operating in state S1 and HD shore power becomes unavailable, transition T5 occurs from state S1 to state S2 if tractor generator power is available and all environmental-signal qualifications are met (e.g., ambient temperature conditions). Similarly, transition T6 from state S3 to S2 occurs if HD shore power is not available but tractor generator power is available, and all environmental signal qualifications are met. The same logic applies to transition T7 from state S4 to state S2. Both the T6 and T7 transitions are based on the logical assumption that drawing from a battery system is less preferred than running from the generator 20 during times that the engine 12 is running. Similarly, transition T8 from state S5 to state S2 occurs if tractor generator power becomes available, subject to any temperature or other environmental signal qualifications.

Continuing with the state transition descriptions, transition T9 from state S1 to state S3 occurs if HD shore power becomes unavailable and tractor power is not available. Notably, the transition into state S3 can be predicated on the associated battery system's state of charge. For example, all transitions into state S3 (T9-T12) can be predicated on the state of charge of the battery used to source auxiliary 480 VAC power. If that battery is depleted or below a given level of remaining charge, the power preference logic changes and state S3 becomes less preferred than states S4 and S5, for example.

The same or similar state-of-charge considerations can be applied to transitions T13-T16 into state S4. Likewise, variable-conditioned transition logic may be used for state transitions T17-T20. For example, a baseline or default logic program of the IPC 266 may be to undertake transition T11 from state S4 to state S3 if AUX2 power becomes unavailable, and neither of shore and tractor power is available. However, the IPC 266 may modify that selection preference in response to receiving a low battery indicator for the battery system associated with AUX1 power. For example, it may transition from state S4 to state S5 instead.

As a further sophistication, the IPC 266 may reconcile multiple variables. For example, it may re-prioritize its state selection preferences based on reconciling a low-fuel warning for the refrigeration unit engine 120 that is concurrent with low-battery warnings for either or both of AUX1 and AUX2. In such situations, the IPC 266 may switch more rapidly between available power sources, or may stick in a given state despite system warnings, with the goal of keeping the refrigeration unit motor 124 powered for as long as possible. Of course, the program logic of the IPC 266 can be configured to pursue that goal, while avoiding damaging any supporting systems, e.g., avoiding deep discharge of onboard battery systems.

Complementing such operation, in at least one embodiment, the IPC 266 is configured to monitor battery charge state, at least whenever the IPC 266 is deriving refrigeration unit power from a battery-based system. Such monitoring may simply be monitoring a low-charge warning signal. In any case, the IPC 266 can be configured to stop drawing refrigeration unit power from a given battery source, responsive to detecting a low-battery condition for that source, at least whenever there is another source of power available.

As another example of the intelligent power controller's dynamic determination of order of preference, a default preference scheme considers the AUX2 power of state S4 as more preferable than the RU power of state S5. However, the IPC 266 dynamically remaps RU power as being more preferred than AUX2 power in response to the assertion of a low-battery (or a fault indicator assertion) for the battery system associated with AUX2 power. Similar dynamic reordering of power system preferences can be done for one or more of the other states, and those skilled in the art should appreciate that the IPC 266 is, in one or more embodiments, monitoring and considering multiple variables in determining whether and when to undertake transitions from one state to another.

Similar state control logic and power optimization can be implemented within the IPMS 250 for the bus 26. From FIGS. 1-3, one sees that the bus 22 may be a three-phase 480 VAC power bus, while the bus 26 may be a single-phase 120 VAC power bus. Referring to FIG. 9A, one sees that the step-down transformer 84 of the IPMS 250 is used to provide one source of power for energizing the bus 26. This use is advantageous because it means that the bus 26 can be powered by any one of the power sources input to the multiplexing switches 252. In at least one embodiment, the step-down transformer 84 is configured to output single-phase 120 VAC power as derived from 480 VAC power input to it.

In more detail, and with continuing to FIG. 9A, one sees that the illustrated embodiment of the IPMS 250 includes a complementary pair of relays/contactors 330, where one contactor is tied to the output of the step-down transformer 84 and the other contactor is tied to the MD shore power input 82. The contactors are configured for mutually exclusive operation—i.e., when one is closed, the other is opened. More particularly, the contactors are configured such that contactor associated with the MD shore power input 82 closes whenever that input has power applied to it. (Note that such control can be predicated on sensing acceptable voltage, etc.)

As such, the bus 26 is preferentially energized by MD shore power, but automatically reverts to the step-down transformer's output whenever the MD shore power input 82 is not energized. In this manner, the IPMS 250 keeps the bus 26 energized either from MD shore power, or from the currently selected one of the multiplexed power sources input to the switches 252. (Note that the IPC 266 can accomplish the same control by explicitly controlling switches rather than the automatically energized relays/contactors 330.)

The above reference to energizing the bus 26 from either MD shore power or a selected power source within the set 256 relates particularly to the embodiment illustrated in FIG. 2. In FIG. 2, recall that the refrigeration unit generator 122 is connected to bus 22 as a power source within the set 256. In FIG. 1, however, the refrigeration unit generator 66 is instead connected to bus 26. Accordingly, the IPMS 250 in FIG. 9A may also include an additional relay/contactor 331 tied to the refrigeration unit generator 66. In this case, the bus 26 may revert to the refrigeration unit generator power whenever power is not available from either the MD shore power input 82 or the multiplexed power sources. When so powered, the other relays/contactors 330 are either automatically energized or controlled by the IPMS 250 so that they are closed, while the relay/contactor 331 is energized or controlled to be open.

With the above arrangement, the bus 26 represents an advantageous source of power for running various AC-powered vehicle subsystems, such as the APU air conditioner 40 and the APU charger 42. Thus, in one or more embodiments, the IPMS 250 provides one or more AC power outputs 332, for providing power from the bus 26 to run the APU air conditioner 40 and/or the APU charger 42. As a distinct advantage, it will be noted that this arrangement allows any of the multiplexed power sources input to the switches 252 to be used as power sources for running the APU air conditioner 40 and/or running the APU charger 42. More particularly, this means that the APU battery 46 can be efficiently charged by the generator 20 and/or by the refrigeration unit engine 120/generator 122.

In at least one embodiment of the IPMS 250, this arrangement enables the use of a smaller battery pack for the APU battery 46, which saves significant space, weight, and money. The smaller battery pack is made possible because the IPMS 250 provides more sources with more persistent availability for charging the APU battery 46. That is, a conventional APU battery might be sized for eight hours of operation between charging. With the IPMS 250, however, the refrigeration unit 60 can be run briefly, to provide charging power to the APU battery 46 and/or to directly operate the APU air conditioner 40.

Thus, in at least one embodiment, the IPMS 250 is configured to monitor the APU battery voltage, and to briefly initiate running of the refrigeration unit 60, for APU battery recharging. For example, the IPMS 250 may be configured to run the refrigeration unit 60 for 15 minutes, on one-hour intervals, as needed to keep the APU battery 46 within a desired range of charge. Of course, such operations are seamlessly integrated with normal operation of the refrigeration unit 60, as part of maintaining desired thermal conditions within the refrigerated compartment, and control logic can be included in the IPMS 250 to prevent over-chilling of the refrigerated compartment, even as the IPMS 250 tries to maintain APU battery charge.

As a further advantage, the IPMS 250 may generate a control signal 334 to operate a de-coupling switch 336 that can be opened to unload the APU air conditioner 40 and/or APU charger 42 from the bus 26. This optional switch adds to the flexibility of the IPMS 250 by preventing additional AC loading on the bus 26, if it is not desirable to have the APU load power drawn from the currently selected one of the multiplexed power sources used for powering the bus 22. For example, it may be fine to run the APU charger 42 using power derived from the generator 20, along with using tractor generator power to run the refrigeration unit motor 124. However, some models of the refrigeration unit 60 may not have sufficient generation capacity to use their generator 122 for powering the APU and other accessory AC loads of the tractor, along with the refrigeration unit motor 124.

As such, the power output 332 may be disconnected from the bus 26 as needed or desired. Notably, that power output 332 also may be used for powering other AC accessory loads, such as the loads 24 shown in FIGS. 1-3. However, at least some embodiments of the IPMS 250 includes a supplemental AC power output 338, for providing AC power from the bus 26. This arrangement provides additional wiring flexibility, and may simplify interconnection of the IPMS 250 with vehicle wiring harnesses. As with the output 332, the IPC 266 optionally generates a control signal 340, which operates a de-coupling switch 342, thus allowing the IPMS 250 to de-energize the output 338 whenever it is desired to remove those loads from the bus 26.

As a further point of flexibility, one or more embodiments of the IPMS 250 include an AC/DC power converter 344, used to generate a high-current DC output, which is provided on a DC output connection 346 of the IPMS 250. This DC output, e.g., a 12 VDC output can be used for powering DC accessories, and it also can be used as an advantageous source for battery charging. For example, it can be wired in as a backup charging system for the primary battery 30 and/or the APU battery 46. Note, too, that it can wired into the IPMS's DC bus 18, and thus serve as another source for keeping that bus energized.

Reverse voltage protection is, of course, included where needed for the various power connections of the IPMS 250 and, for example, DC power from AC/DC power converter 344 may be diode-protected from reverse voltages as part of interconnecting it with the bus 18 or routing it to the DC output 346. Further, one or more battery terminal isolation and connection re-routing switches may be optionally installed as part of the IPMS installation, to provide for either-or charging of the primary battery 30 from the tractor's conventional alternator system, or from IPMS-controlled power.

As one example, the DC power optionally output from the IPMS 250 is, in one or more embodiments, wired into the battery system of the refrigeration unit 60, meaning that the IPMS 250 provides an efficient battery-charging power source for that unit. This configuration is particularly advantageous in tractor units 10 that lack an onboard APU system, which might otherwise be used as a source of charging power for a refrigeration unit battery. Of course, this DC power can be used to charge any number of onboard battery systems, and it can be operated anytime the bus 26 is energized.

Broadly understood, derivation of 12 VDC power from the 120 VAC bus 26 allows usage of any one or more 480 VAC sources to be used as a high-capacity source of DC current for use in powering various onboard DC systems and/or for charging various onboard battery systems. Such charging can supplement existing charging systems, e.g., the tractor's alternator-based battery charging system, or supplant them if they malfunction.

These efficiency advantages regarding the use of power from the generator 20 depend on efficient and reliable operation of that generator. While one or more embodiments use the generator 20 as a replacement for the more conventional alternator of the combustion engine 12, it should be understood that one or more other embodiments retain the conventional tractor engine alternator. In such embodiments, the generator 20 is installed as an additional engine-driven electrical power generation unit. As such, the generator 20 is particularly configured for efficient and reliable operation over the normal range of engine speeds expected for the tractor engine 12.

As a first point, the generator 20 is configured to provide all or a substantial portion of its rated output power at nominal idle speeds. For a given 480 VAC implementation, the generator 20 is configured to provide three-phase output power in the 7.5-20 KW range, which is suitable for running large refrigeration units. Further, the generator 20 is built or otherwise electronically conditioned to provide consistent output voltages over the expected range of engine RPMs.

In one embodiment, the generator 20 is a modified version of the T20F 3-phase generator by MECCALTE spa, an Italian generator manufacturer. As a first modification, the generator is adapted to belt drive, rather than the intended direct axial drive, by replacing its shaft bearing with a heavier and more precisely machined bearing. Thrust washers are also added. In this manner, the generator 20 is well suited for belt drive as part of the tractor's accessory drive system.

Further, given an example ratio of 3.6:1 for generator RPM versus tractor engine RPM, the generator 20 is conditioned for high-RPM operation by replacing its windings with heavier and more dense straight-wound windings. Additionally, a thicker conformal coating is applied to the heavier duty windings, for further mechanical strength.

As a further speed adaptation, or, more precisely, to adapt the generator 20 suitable voltage output over a wide range of tractor engine speeds, e.g., from 600 RPM at idle to 1800 RPM on the highway, the generator's excitation fields are varied under closed-loop control, to maintain generator voltage output at or around a desired nominal value. For example, the excitation field control may raise or lower the DC voltage applied to the tractor generator's field windings, as needed, to hold the tractor generator's output voltage within a relatively tight voltage range.

More particularly, closed-loop control raises (lowers) the excitation field voltage as engine/generator RPMs decrease (increase), based on using the tractor generator's output voltage as the control-loop error signal. In one or more embodiments, an automatic voltage regulator (AVR) is used to control the tractor generator's field excitation voltage, and in at least one such embodiment a Model SS15A-2 AVR by MCPHERSON CONTROLS is used.

The SS15A-2 is a 15 A, ½-wave, self-excited universal voltage regulator, that provides a variable-voltage field output for controlling a generator's field excitation voltage as a function of sensing the generator's primary output voltage. The unit provides a VOLTS potentiometer for setting the sensing voltage of the unit, which corresponds to the target output voltage of the generator; a DROOP potentiometer for adjusting the amount of generator voltage droop that occurs for a given amount of reactive load current; a STABILITY potentiometer for adjusting operating stability; and a U/F potentiometer for adjusting the lower frequency roll-off point. These potentiometers allow tuning of the AVR, as needed for the given generator and load characteristics.

Optionally, in addition to conditioning the generator 20 for belt-drive and variable/high-RPM operation as just described, further power conditioning may be advantageously applied to the tractor generator's output power. For example, to ensure proper phasing of the tractor generator-derived power and clean voltage waveforms, the tractor generator's output may be run through an inverter module 310, such as shown in FIG. 12, and the inverter's output passed through a load reactor.

Figure 17:
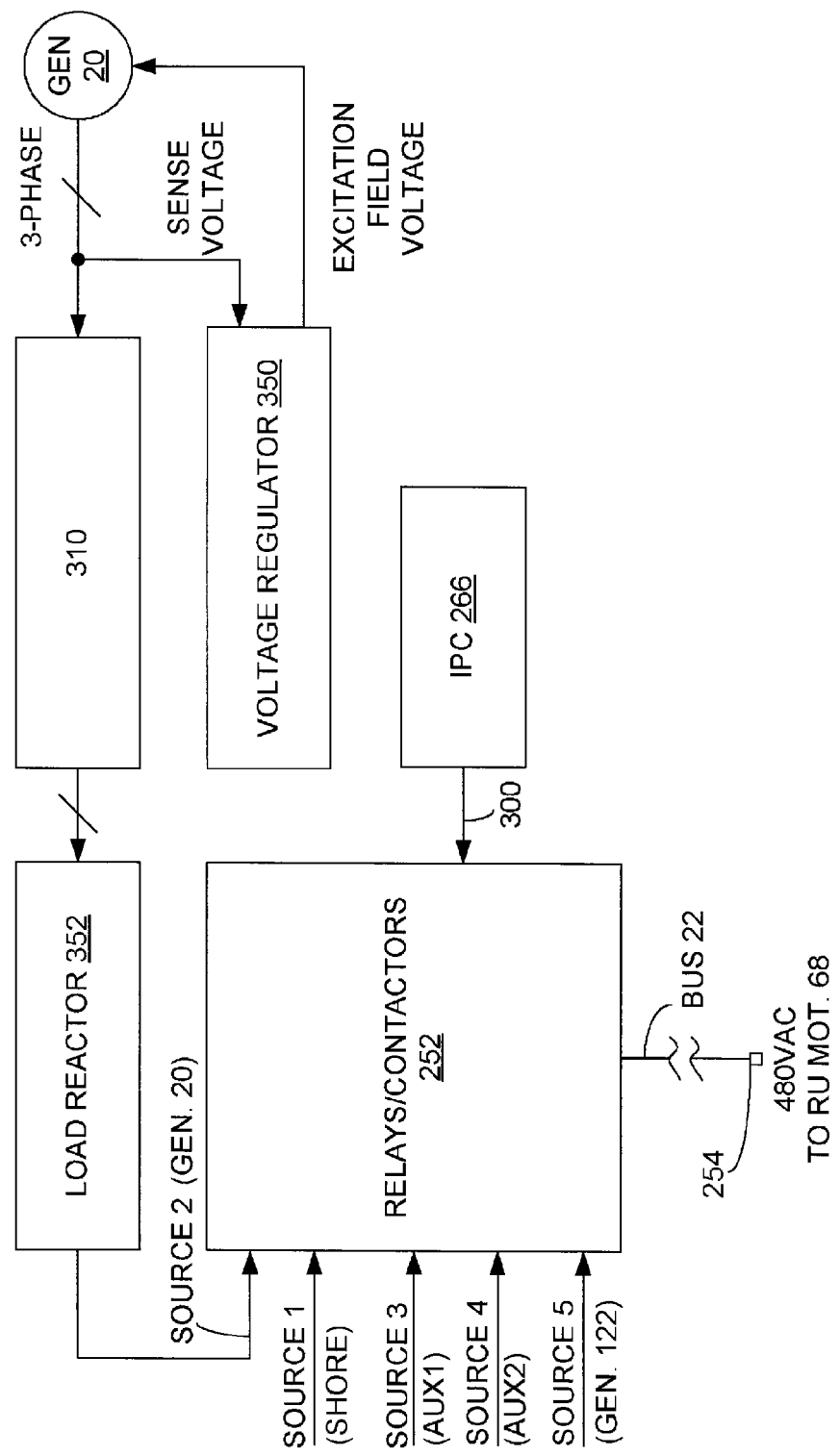
FIG. 17 is a block diagram of an embodiment of the intelligent power management system, particularly illustrating an example arrangement for conditioning tractor generator power.

With that configuration in mind, FIG. 17 illustrates a non-limiting but advantageous arrangement for obtaining clean working power from the generator 20 over a wide range of tractor engine speeds, and for ensuring reliable generator operation at sustained high speeds. Here, the inverter module 310 is used for ensuring correct phasing of multi-phase power from the generator 20, as well as providing waveform smoothing. The inverter 310 also may provide power quality/voltage range monitoring for availability monitoring by the IPC 266.

Further, a voltage regulator 350 is configured to provide closed-loop control of the excitation field voltage of the generator 20, to maintain that generator's output voltage within a desired voltage range over a defined range of tractor engine RPMs. For further power quality conditioning, the IPMS 250 may include a load reactor 352 that conditions the inverter's output. Thus, the load reactor 350 provides very good quality power to the multiplexing switches 252, as sourced from the generator 20 through the inverter 310.

With reference to the illustration, the inverter module 310 optionally comprises a BALDOR VS1S1 425-1B inverter module, and the voltage regulator 350 for closed-loop control the excitation fields of the generator 20 optionally comprises the previously mentioned MCPHERSON SS15A-2 AVR. Further, the load reactor 352 optionally comprises a BALDOR LR AC03502 load reactor. Of course, these part/model numbers are non-limiting examples, and those skilled in the art will recognize that the speed ranges and generator load characteristics may require the selection of other part models and types.

Further, in addition to conditioning the generator 20 for variable-RPM and sustained high-RPM operation, at least one embodiment provides for a high-RPM disengagement of the generator 20 from the tractor engine 12. In particular, at least one embodiment couples the generator 20 to the tractor engine's accessory belt drive system through a clutch assembly.

In another advantageous provision included in one or more embodiments of the IPMS 250, a manual system bypass switch is provided as part of the installation. Preferably, this switch is configured to selectively revert the refrigeration unit 60 back to its normal wiring/operation configuration. As such, the operator can disconnect the IPMS 250 from the refrigeration unit 60 in cases where the intelligent power management system is unavailable or is otherwise malfunctioning.

Figure 18:
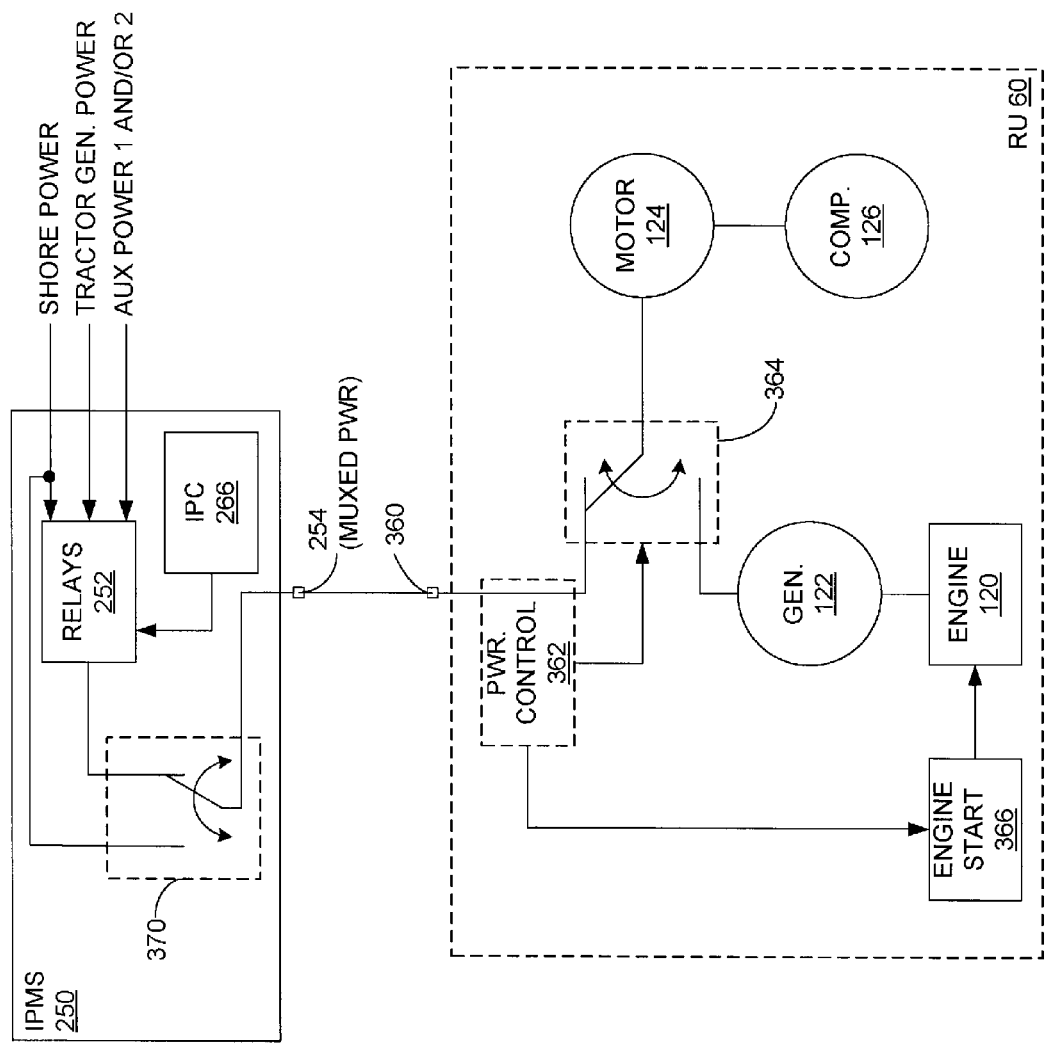
FIG. 18 is a block diagram of an embodiment of the intelligent power management system, particularly illustrating its interconnection with one type of refrigeration unit.

Additionally, although the manual override switch may be preferred in all or many embodiments contemplated in this document, it should be understood that operations and controls associated with the IPMS 250 can be largely transparent to the refrigeration unit 60. FIG. 18, for example, illustrates the IPMS 250 coupled to an "auto-switching" type of refrigeration unit 60.

In an auto-switching configuration, the refrigeration unit 60 is configured to run from shore power whenever shore power is applied to its shore power input, and to automatically revert to running from its diesel or gas engine in the absence of shore power. Auto-switching refrigeration units are known, and example models are available from CARRIER and THERMOKING, for example. The IPMS 250 transparently improves operation of auto-switching refrigeration units by providing multiplexed external power to the unit's "dedicated" shore power connection.

FIG. 18 illustrates a non-limiting example of the IPMS 250 providing multiplexed power, e.g., 480 VAC power, to an auto-switching embodiment of the refrigeration unit 60. In the illustration, the refrigeration unit 60 includes a shore power connection 360. The refrigeration unit 60 further includes a power control circuit 362 that is configured to switch the refrigeration unit motor 124 to run from shore power when shore power is applied to the shore power connection 360, and to run from the generator 122 when shore power is not available. A switch 364 may be operated under control of the power control circuit 362, to effect auto-switching between shore power and onboard generator power.

For running from the generator 122, the power control circuit 362 provides an initiation signal to an engine starting circuit 366. The engine starting circuit 366 starts the onboard engine 120 in response to the start initiation signal from the power control circuit 362. With this configuration, the refrigeration unit 60 runs from shore power when it can, and otherwise runs from onboard power, as provided by its engine 120 and generator 122.

The IPMS 250 greatly increases the efficiency, flexibility, and automation of such an arrangement, by providing multiplexed power, rather than shore power, to the shore power connection 360 of the refrigeration unit 60. That is, the IPMS 250 receives any one or more of HD shore power, tractor generator power, and, optionally, one or more various auxiliary powers, and automatically chooses the "best" one, from among the available power sources. ("Best" connotes efficiency/availability based selection, such as exemplified in FIGS. 14 and 16.)

In this manner, the refrigeration unit 60 is provided with power from any one of a number of sources, with source switching automatically controlled by the IPMS 250. Thus, rather than simply running from shore power or onboard power, the refrigeration unit 60 automatically runs from any one of a given number of external power sources, as automatically selected by the IPMS 250 and provided on its multiplexed power output 254. Note that the IPMS 250 advantageously may include a manual override switch 370 that bypasses power multiplexing via the relays/contactors 252, and provides a manually-switched direct connection between the system's multiplexed power output 254 and HD shore power. Switch 370 thus allows an operator to make a direct connection between HD shore power and the refrigeration unit 60, if the IPMS 250 malfunctions or needs to be taken offline.

Figure 19:
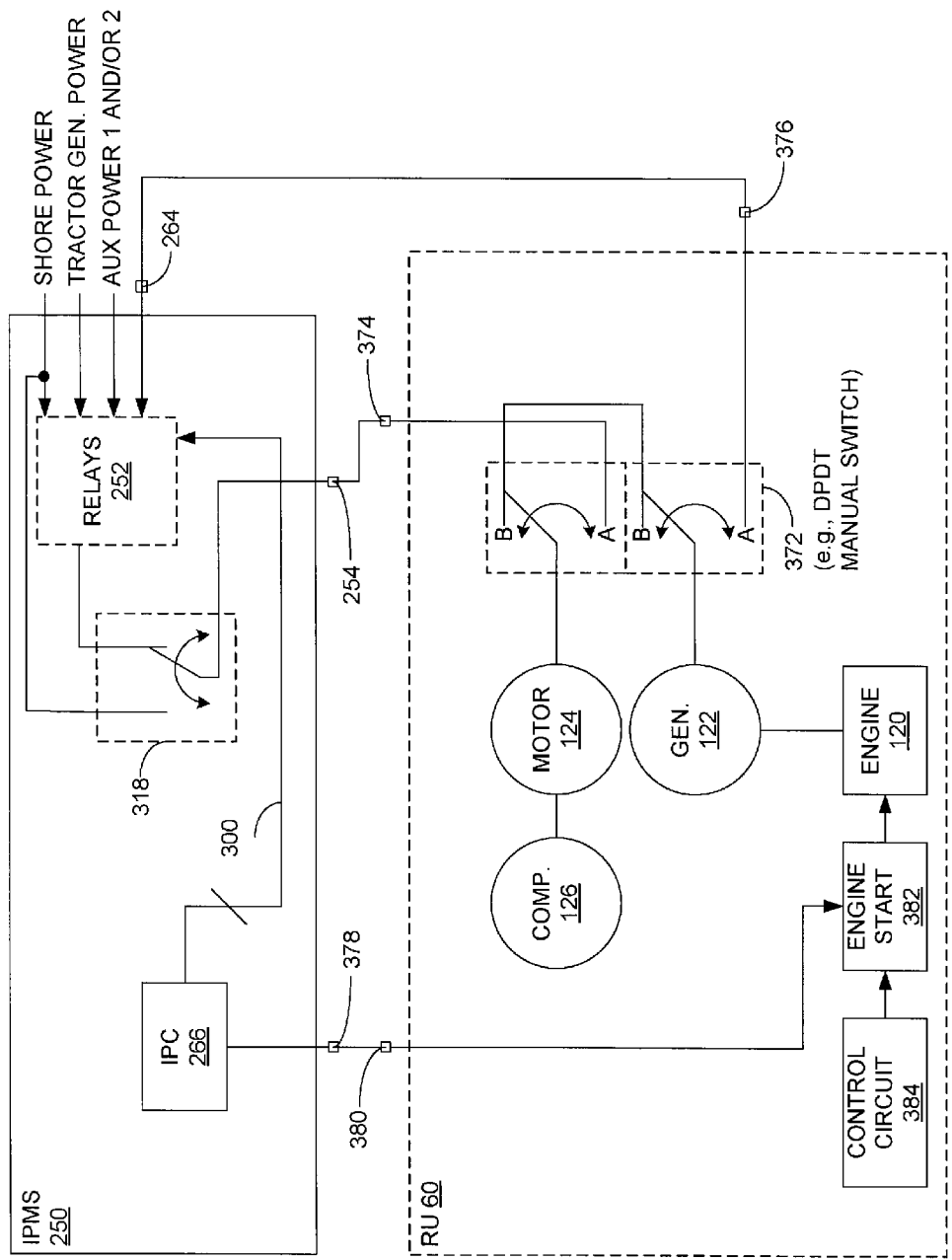
FIG. 19 is a block diagram of an embodiment of the intelligent power management system, particularly illustrating its interconnection with another type of refrigeration unit.

FIG. 19 illustrates another embodiment, one that is particularly suited for retrofitting or otherwise adapting to a refrigeration unit 60 that was not designed with auto-switching capabilities, and, instead, was intended to always run from its onboard engine 120 and generator 122. In this and related embodiments, one may add a double-pole, double-throw (DPDT) switch 372 to the refrigeration unit 60, or otherwise wire such a switch into association with the refrigeration unit 60. Preferably, the switch 372 is a manual switch, or is otherwise made failsafe, such that the refrigeration unit 60 can be reverted back to dedicated operation from its onboard power, if the IPMS 250 malfunctions or is otherwise taken offline.

In more detail, for the illustrated configuration of the switch 372, the operator switches to the "A" terminal positions to run the refrigeration unit 60 under optimized control of the IPMS 250. Conversely, the operator sets the switch 372 to the "B" terminal positions to run the refrigeration unit 60 from its onboard engine 120 and generator 122. The "B" terminal setting thus functions as a failsafe or override position, allowing the refrigeration unit 60 to run from its onboard engine/generator set, irrespective of whether the IPMS 250 is installed, or working properly.

Correspondingly, one sees that, with the switch 372 set to its "A" terminals, the refrigeration unit 60 receives multiplexed power on an external power input 374, and can provide its own generated power externally via its generator output 376, at least when the engine 120 is driving the generator 122. Externally routing the power output from the generator 122 in this manner—i.e., connecting the generator output 376 to the power input 264 of the IPMS 250—allows the generator 122 of the refrigeration unit 60 to function as one of any number of available power sources that may be multiplexed onto the power output 254 of the IPMS 250, for running the refrigeration unit 60. Further, this routing allows the IPMS 250 to use the onboard engine/generator set of the refrigeration unit 60 as an alternative or supplemental APU. That is, the IPMS 250 can use the refrigeration unit's onboard engine/generator set for powering various vehicle systems. Non-limiting examples include using the refrigeration unit's onboard engine/generator set for deriving 120 VAC power for various uses, charging truck and/or primary APU batteries, powering HVAC and other hotel loads in the cab, etc.

Note, too, that the illustrated IPMS 250 includes an engine start output 378, which provides an engine start signal to a corresponding input 380 on the refrigeration unit 60. Correspondingly, the signal applied to input 380 may be routed to an engine start circuit 382, which also may respond to an onboard control circuit 384 that is part of the refrigeration unit's original or factory-installed control system. Those skilled in the art will appreciate that a preexisting refrigeration unit 60 can be configured according to FIG. 19 simply by adding the illustrated switch 372, and wiring connections 374, 376, and 380, along with making corresponding internal wiring changes to the refrigeration unit 60. Those skilled in the art will also appreciate that new refrigeration units 60 may be factory-built according to FIG. 18 or 19.

Those skilled in the art will also appreciate that FIGS. 18 and 19 are non-limiting examples, and that other interconnection and wiring arrangements may be adopted, as needed or desired for a given refrigeration unit configuration. For example, a given refrigeration unit 60 may include or be provided with a control interface that accepts a "run" signal, rather than an explicit engine start signal, which may be provided by the IPMS 250. The particular control signaling and wiring needed between the IPMS 250 and the refrigeration unit 60 plainly depends on the refrigeration unit make and model, and the appropriate wiring will be easily appreciated by the skilled installer.

Still further, in terms of understanding the non-limiting and exemplary nature of the above-described system embodiments, the use of "including", "comprising" or "having" and variations thereof herein is meant to encompass the items listed thereafter and equivalents thereof as well as additional items. Unless specified or limited otherwise, the terms "mounted", "connected", "supported" and "coupled" and variations thereof are used broadly and encompass direct and indirect mountings, connections, supports and couplings.

With these broad definitions in mind, it will be appreciated that this document discloses examples of a power management system 250 for selectively directing multiple sources of power, according to an order of preference, to a refrigeration unit 60 that cools a refrigeration compartment of a refrigerated truck. In one or more embodiments, the power management system 250 comprises a set 256 of power inputs, with each power input configured to receive an independent source of electrical power.

In at least one such embodiment, the set 256 of power inputs includes a shore power input 80, for receiving (HD) shore power from a shore power source, and a truck engine driven generator power input 258, for receiving power generated by a generator 20 driven by a truck engine 12. Other power inputs may be provided as well, for further flexibility. Regardless, the power management system 250 further includes the previously detailed switching circuit 252, which is operatively interconnected between the refrigeration unit 60 and the shore power input 80 and the truck engine driven generator power input 258. With these operative interconnections, in one mode the switching circuit 252 directs shore power to the refrigeration unit 60 and in another mode the switching circuit 252 directs power from the truck engine driven generator 20 to the refrigeration unit 60.

Further, as detailed, the power management system 250 includes a controller operatively associated with the switching circuit 252—e.g., the IPC 266—for switching the switching circuit 252 and selecting one of the modes, based on dynamically determining which power sources are available and correspondingly identifying a preferred one of the power sources according to a defined order of power source preference. The controller may further operate the switching circuit 252 in one or more additional modes, where various other sources of power are selected according to the power source preferences, and the controller is configured in one or more embodiments to dynamically change between modes, responsive to changing power source availabilities, changing ambient temperatures, etc.

In at least one embodiment, the controller is operative to start an engine included in the refrigeration unit 60, for powering the refrigeration unit 60 from its included engine 62 or 120, if no more-preferred sources of electrical power are available. Further, the power management system 250 also includes a power sensing circuit 270 in one or more embodiments, for determining the availability of shore power and the availability of power generated by the truck engine driven generator 20. The power sensing circuit 270 may comprise more than one monitoring circuit, and thus may be used to monitor multiple power sources for availability.

Further, in at least one embodiment, the power management system 250 includes a voltage control circuit, for connecting to the truck engine driven generator 20 and controlling and maintaining the voltage output of the truck engine driven generator 20 within a selected range over an RPM range of the truck engine 12. The voltage control circuit is configured in one or more embodiments as a closed loop control circuit, for maintaining the voltage output of the truck engine driven generator 20 in a selected range for an RPM range of the truck engine 12. As one example, the closed loop control circuit includes a voltage regulator 350 having a voltage signal input that receives a voltage signal indicative of the voltage output of the truck engine driven generator 20, and based on the voltage signal received, the voltage regulator 350 selectively varies an excitation field voltage of the truck engine driven generator 20 so as to maintain the voltage output of the truck engine driven generator 20 in the selected range.

Further, in at least one embodiment, the power management system 250 includes an environment monitoring circuit 282 operatively connected to the controller 266 for varying the defined order of power source preference based on sensed environmental conditions.

Further, in at least one embodiment, the set 256 of power inputs includes a refrigeration unit power input 264, for connecting to a power output 376 of the refrigeration unit 60, such that power generated by the refrigeration unit 60 can be routed through the power management system 250 for distribution. Additionally, in one or more embodiments, the set 256 of power inputs includes one or more auxiliary power inputs, e.g., inputs 260 and 262, having a lower order of power source preference than either shore power or power generated by the truck engine driven generator 20. Also, as noted, in at least one embodiment, the set 256 of power inputs includes a refrigeration unit power input 264, for connecting to a power output 376 of the refrigeration unit 60, such that power generated by the refrigeration unit 60 can be routed through the power management system 250.

Further, in at least one embodiment, the power management system 250 includes a relatively high VAC bus 22, for directing power from at least two of the multiple power sources to the refrigeration unit 60; a relatively low VAC bus 26, for powering one or more power-consuming AC components, other than the refrigeration unit 60, on the refrigerated truck; a DC bus 18, for powering one or more of the DC power-consuming components on the refrigerated truck; and a step-down transformer 84 that is operatively interconnected between the relatively high and relatively low VAC buses 22 and 26, for supplying a stepped-down voltage to the relatively low VAC bus 26.

Further, in at least one embodiment, the intelligent power management system 250 includes a second shore power input 82, configured to receive shore power from a second shore power source having a voltage different than the first shore power source intended for the first shore power input 80. For example, the first shore power input 80 is an HD shore power input for receiving 3-phase 480 VAC power, while the second shore power input 82 is a MD shore power input for receiving single-phase 120 VAC power. As such, the intelligent power management system 250 is configured to power at least one power consuming component other than the refrigeration unit 60 from the second shore power source via the second shore power input 82, or from power supplied from the switching circuit 252, as stepped down through the transformer 84, based on a selected preference.

In other embodiments, the power management system 250 can be retrofitted into existing refrigerated trucks such that the refrigeration units 60 of these trucks can be driven by multiple sources of power at various times. The retrofitting process will vary depending on the structural and functional makeup of the refrigerated truck. For example, as illustrated in FIGS. 1 and 2, and as discussed herein above, the design of existing refrigeration units 60 can vary. But in any event, the general method or process for retrofitting existing refrigerated trucks includes numerous common procedures.

First, a generator 20 is secured or mounted to the refrigerated truck. The generator 20 can be mounted in various locations on the truck as described above and as shown in FIGS. 6-8. The generator, once mounted to the refrigerated truck, is drivingly connected to the truck engine 12. This enables the generator 20 to be driven by the truck engine 12.

A power management system 250 is mounted on the refrigerated truck. The power management system 250 can be mounted at various locations on the refrigerated truck. In one embodiment, the power management system 250 utilized in the retrofitting process includes a switching circuit 252, a programmed controller 266 and a set 256 of power inputs. Each of the power inputs is configured to receive an independent source of electrical power. In this exemplary retrofitting process, the set of power inputs includes a shore power input 80 for receiving shore power from a power source, and a power input 258 for receiving power generated by the generator 20 that is powered by the truck engine 12. In retrofitting the power management system 250, the generator 20 is operatively connected to the truck engine driven generator power input 258. This allows power generated by the generator 20 to be directed to and through the power management system 250. Also, the retrofitting method entails operatively connecting the switching circuit 252 between the refrigeration unit 60 and the shore power input 80 and the truck engine driven generator power input 258. This permits the switching circuit 252 in one mode to direct shore power to the refrigeration unit 60, and in another mode the switching circuit directs power from the truck engine driven generator 20 to the refrigeration unit 60. The programmed controller 266 is operatively connected to the switching circuit 252. The programmed controller 266 is operative to actuate the switching circuit 252 and select one of the modes based on dynamically determining which power sources are available and correspondingly identifying or selecting a preferred one of the power sources according to a defined order of power source preference.

In one embodiment, the program controller 266 actuates the switching circuit 252 according to logic that includes an order preference where shore power is preferred over power from the truck engine driven generator 20. The power management system also provides that the refrigeration unit engine 62 or 120 is generally only actuated or used when power from a higher preference source is unavailable. Therefore, in one embodiment the controller 266 and the power management system 250 are configured to utilize shore power, if available, and if shore power is unavailable, to utilize power from the truck engine driven generator 20. If power from the truck engine driven generator 20 is unavailable, then power generated by the refrigeration unit is used. It is appreciated that there could be other sources of power that would have a higher preference than power generated by the refrigeration unit.

In some cases the existing refrigeration unit may include an existing electric motor for driving the compressor of the refrigeration unit 60. In other cases the existing refrigeration unit may not include an electric motor. In the latter case, one exemplary retrofitting method includes providing the refrigeration unit 60 with an electric motor. In either event, the retrofitting method, in one embodiment, includes providing the refrigeration unit 60 with a power output for outputting power generated by the refrigeration unit 60, and operatively connecting the refrigeration unit power output with one of the power inputs to the switching circuit 252. This permits power generated by the refrigeration unit 60 to be routed to and through the switching circuit 252 for distribution on the refrigerated truck. In this case, power generated by the refrigeration unit 60 can be directed from the switching circuit 252 back to the refrigeration unit 60 for use, or the power generated by the refrigeration unit 60 can be utilized by other power consuming components on the refrigerated truck.

As discussed above, in certain conditions it may be necessary to power the refrigeration unit 60 with its onboard or associated engine 62 or 120. This can be accomplished through various ways. In the embodiment illustrated in FIG. 19 the controller 266 is operatively connected to the engine start circuit 382. The controller is particularly programmed to start the engine 120 in that embodiment when the order of power source preference calls for the engine of the refrigeration unit 60 to supply the power. In a refrigeration unit 60, such as shown in FIG. 18, the power control circuit 362 that is typically found in the refrigeration unit itself is utilized to actuate or start the engine 120 when one or more higher preference sources of power is unavailable.

In one embodiment, the retrofitting method includes installing a transformer on the refrigerated truck and connecting the transformer between a relatively high VAC bus 22 and a relatively low VAC bus 26. This permits the voltage on the relatively high VAC bus 22 to be stepped down and applied to the relatively low VAC bus 26. The retrofitting method includes operatively connecting the relatively low VAC bus 26 to one or more power consuming components, other than the refrigeration unit 60, on the refrigerated truck. In one example, the low VAC bus 26 can be utilized to power an HVAC system 40 on the refrigerated truck and/or charge one or more batteries that are associated with the HVAC system 40 for powering the same under certain conditions.

In some cases, the retrofitting process or method will include providing the power management system with first and second shore power inputs 80 and 82 where the first shore power input is configured or designed to receive power from a first shore power source, and the second shore power input is designed or configured to receive shore power from a second shore power source having a voltage different from the first shore power source. The retrofitting process entails connecting the second shore power input and the switching circuit to an HVAC system 40 on the refrigerated truck such that the HVAC system 40 can be powered from either the second shore power source via the second shore power input or from the power supplied through the switching circuit.

The above description provides examples of a number of retrofitting methods. These examples do not limit the invention, but, rather, are only provided to better illustrate the present invention. Indeed, those skilled in the art will readily appreciate other retrofitting methods not included in the above description based on the provided examples and knowledge of conventional refrigerated trucks.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A power management system configured for use on a refrigerated truck, said system comprising:

a first AC power bus associated with a first AC voltage level;

a plurality of first AC power inputs, each associated with a corresponding AC power source and selectively coupled to the first AC power bus so that the first AC power bus is powered by the corresponding AC power source through a selected one of the first AC power inputs, said first AC power inputs including two or more of: a generator input for receiving three-phase AC power at said first AC voltage level from an engine-driven generator of said refrigerated truck; an inverter input for receiving three-phase AC power at said first AC voltage level from a battery-powered inverter onboard said refrigerated truck; a first shore power input for receiving three-phase AC power at said first AC voltage level from a shore power source; and a second generator input for receiving three-phase power at said first AC voltage level from dedicated generator associated with a refrigeration unit of said refrigerated truck;

a step-down transformer having an input coupled to said first AC power bus and an output selectively coupled to a second AC power bus included in said system and configured to provide single-phase AC power to said second AC power bus at a second AC voltage level, based on being configured to step down said first AC voltage level on said first AC power bus, so that said second AC bus is selectively powered from said first AC bus but at said second AC voltage level, for powering one or more loads onboard said refrigerated truck at said second AC voltage level;

one or more first AC power outputs coupled to said second AC power bus and configured to provide said single-phase AC power at said second AC voltage level, including at least one of: an accessories output for powering one or more accessory systems onboard said refrigerated truck; an Auxiliary Power Output (APU) output for powering an APU onboard said refrigerated truck; an HVAC output for powering an HVAC system associated with a cab of said refrigerated truck; and an auxiliary power output for powering one or more accessory systems external to said refrigerated truck;

a multiplexed power output coupled to said first AC power bus for providing three-phase AC power at said first AC voltage level to the refrigeration unit of the refrigerated truck; and a controller configured to control a switching circuit to dynamically select one of the first AC power inputs for powering the first AC power bus from the corresponding AC power source, based on determining which ones of the corresponding AC power sources are available and selecting one of the available AC power sources according to a programmatic order of preference, and further configured to dynamically modify the programmatic order of preference based on evaluating one or more environmental monitoring signals input to the controller.

2. The power management system of claim 1, wherein the controller is configured to receive, as one of said one or more environmental monitoring signals, an ambient temperature signal indicating an outdoors ambient temperature, and to dynamically change a selection logic used to identify which one of the corresponding AC power sources is considered as the most-preferred source for powering the refrigeration unit as a function of power source availability and the one or more environmental monitoring signals.

3. The power management system of claim 2, wherein the controller is configured to change which one of the corresponding AC power sources is considered as the most-preferred source for powering the refrigeration unit as a function of the ambient temperature signal, thereby making the controller's selection among available ones of the corresponding AC power sources dependent on the outdoors ambient temperature.

4. The power management system of claim 1, wherein the first AC voltage level nominally is 480 VAC and the first AC power bus comprises a three-phase, 480 VAC bus, and wherein the second AC voltage level nominally is 120 VAC and the second AC power bus comprises a single-phase, 120 VAC bus.

5. The power management system of claim 1, wherein the power management system includes one or more power sensing circuits operably associated with the controller, and wherein the controller is configured to automatically sense the availability of one or more ones of the corresponding AC power sources associated with the first AC power inputs and to store indications of availability for use in dynamically adapting said programmatic order of preference.

6. The power management system of claim 1, further comprising a closed-loop control circuit configured to sense an output voltage of the engine-driven generator of said refrigerated truck during operation of the engine, which is a prime mover of said refrigerated truck and, responsive to said sensing, to dynamically increase or decrease an output voltage of the engine-drive generator, as needed, to maintain the output voltage within a defined range around said first AC voltage level.

7. The power management system of claim 1, further comprising one or more second AC power inputs that are selectively coupled via switching circuitry to said second AC bus as alternate power sources for said second AC bus, said one or more second AC power inputs including a second shore power input for providing AC power at said second AC voltage level to said second AC bus, wherein said switching circuitry is operably associated with said controller, and wherein said controller is configured to control said switching circuitry to selectively power said second AC bus from said step-down transformer or from said second shore power input at least in dependence on an availability of AC power at said second AC voltage level from said second shore input.

\* \* \* \* \*